US012791518B2

(12) United States Patent
Yamashita et al.

(10) Patent No.: US 12,791,518 B2
(45) Date of Patent: Nov. 10, 2026

(54) ELECTROCHEMICAL SENSOR, AND MEASURING DEVICE

(71) Applicant: OMRON HEALTHCARE Co., Ltd., Kyoto (JP)

(72) Inventors: Hideyuki Yamashita, Kyoto (JP); Tatsuya Kobayashi, Kyoto (JP); Kazuya Kitayama, Kyoto (JP); Maya Makita, Kyoto (JP); Seiji Fukunaga, Kyoto (JP)

(73) Assignee: OMRON HEALTHCARE CO., LTD., Kyoto (JP)

( * ) Notice: Subject to any disclaimer, the term of this patent is extended or adjusted under 35 U.S.C. 154(b) by 127 days.

(21) Appl. No.: 18/442,588

(22) Filed: Feb. 15, 2024

(65) Prior Publication Data

US 2024/0183819 A1 Jun. 6, 2024

Related U.S. Application Data

(63) Continuation of application No. PCT/JP2022/037889, filed on Oct. 11, 2022.

(30) Foreign Application Priority Data

Nov. 10, 2021 (JP) ................................ 2021-183711

(51) Int. Cl.
*G01N 27/417* (2006.01)

(52) U.S. Cl.
CPC ................................ *G01N 27/4175* (2013.01)

(58) Field of Classification Search
CPC ........... G01N 27/4175; G01N 27/4163; G01N 27/333; G01N 27/26
See application file for complete search history.

(56) References Cited

U.S. PATENT DOCUMENTS

| | | | | |
|---|---|---|---|---|
| 4,946,651 A * | 8/1990 | Liston | G01N 27/3271 | 422/561 |
| 5,234,568 A * | 8/1993 | Tomita | G01N 27/307 | 204/406 |

(Continued)

FOREIGN PATENT DOCUMENTS

| | | |
|---|---|---|
| CN | 103728356 A | 4/2014 |
| CN | 103733057 A | 4/2014 |

(Continued)

OTHER PUBLICATIONS

- International Search Report; Dec. 20, 2022; PCT/JP2022/037889. International Preliminary Report (IPRP) Issued for International Application No. PCT/JP2022/037889, Dated May 8, 2023.

*Primary Examiner* — Shizhi Qian
(74) *Attorney, Agent, or Firm* — Birch, Stewart, Kolasch & Birch, LLP

(57) ABSTRACT

To provide a technology that can suppress an operation unintended by a user caused by an erroneous operation by the user. An electrochemical sensor according to one aspect of the present invention is for measuring a concentration ratio between sodium ions and potassium ions in a liquid to be measured that includes: a sensor head; and a calculation unit that allows performing a calibration operation and a measurement operation. The calibration operation calculates a characteristic parameter of the sensor head based on sensing data of the sensor head in a state where the sensor head is brought into contact with a calibration agent. The measurement operation calculates the concentration ratio based on the characteristic parameter of the sensor head and the sensing data of the sensor head in a state where the sensor head is brought into contact with the liquid to be measured.

12 Claims, 24 Drawing Sheets

(56) References Cited

U.S. PATENT DOCUMENTS

| | | | | |
|---|---|---|---|---|
| 5,393,391 | A | 2/1995 | Dietze et al. | |
| 2002/0014409 | A1 | 2/2002 | Matsumoto et al. | |
| 2007/0261475 | A1* | 11/2007 | Allmendinger | G01N 27/419 73/31.05 |
| 2011/0276278 | A1* | 11/2011 | Ishige | G01N 33/66 422/82.01 |
| 2013/0168265 | A1* | 7/2013 | Iwamoto | G01N 27/28 205/781.5 |
| 2014/0105788 | A1 | 4/2014 | Iwamoto et al. | |
| 2014/0200840 | A1* | 7/2014 | Cox | G01D 18/00 702/188 |
| 2014/0209485 | A1 | 7/2014 | Ohgami et al. | |
| 2020/0116664 | A1* | 4/2020 | Abeyrathne | G01N 27/301 |

FOREIGN PATENT DOCUMENTS

| | | | | |
|---|---|---|---|---|
| EP | 122420 | A2 | | 10/1984 |
| EP | 2720035 | A1 | | 4/2014 |
| JP | 59-190653 | A | | 10/1984 |
| JP | 3-100452 | A | | 4/1991 |
| JP | 2002-48750 | A | | 2/2002 |
| JP | 2009-30981 | A | | 2/2009 |
| JP | 2013-032945 | A | | 2/2013 |
| JP | 2014-95675 | A | | 5/2014 |
| JP | 2014-95692 | A | | 5/2014 |
| JP | 2016080425 | A | * | 5/2016 |

* cited by examiner

ELECTROCHEMICAL SENSOR, AND MEASURING DEVICE

CROSS-REFERENCE TO RELATED APPLICATIONS

This application is the U.S. national stage application filed pursuant to 35 U.S.C. 365(c) and 120 as a continuation of International Patent Application No. PCT/JP2022/037889, filed Oct. 11, 2022, which application claims priority to Japanese Patent Application No. 2021-183711, filed Nov. 10, 2021, which applications are incorporated herein by reference in their entireties.

TECHNICAL FIELD

The present invention relates to an electrochemical sensor and a measuring device.

BACKGROUND ART

Conventionally, there is known an electrochemical sensor for measuring a concentration ratio between two ion species contained in a liquid to be measured. Some electrochemical sensors can perform a calibration operation of obtaining a characteristic parameter of a sensor head used for sensing using a calibration solution before a measurement operation of measuring the concentration ratio between the two ion species contained in the liquid to be measured.

For example, Patent Document 1 describes that a standard solution (calibration solution) having a predetermined concentration ratio between two ion species is used to calculate a reference potential for calibrating a detected potential difference of a liquid to be measured. Patent Document 2 describes a multi-ion sensor that measures a concentration ratio between sodium ions and potassium ions in a sample solution based on respective sensitivity coefficients of a sodium ion electrode and a potassium ion electrode obtained by calibration.

CITATION LIST

Patent Literature

Patent Document 1: JP 2014-095675 A
Patent Document 2: JP 2014-095692 A

SUMMARY OF INVENTION

Technical Problem

However, in the related art, in a case where a calibration switch for performing a calibration operation and a measurement switch for performing a measurement operation are provided in an electrochemical sensor, when a user erroneously operates these respective switches, an operation unintended by the user may be performed.

For example, when the user erroneously operates the measurement switch in a state where the sensor head of the electrochemical sensor is brought into contact with the calibration solution, the measurement operation is performed in a state where the calibration is not correctly performed, and an accurate measurement value is not obtained in some cases. In addition, when the user erroneously operates the calibration switch in a state where the sensor head is brought into contact with the liquid to be measured, inaccurate calibration is performed with reference to the liquid to be measured, and an accurate measurement value is not obtained in the subsequent measurement in some cases.

The present invention is made in view of such circumstances in one aspect, and an object of the present invention is to provide a technology that can suppress an operation unintended by a user caused by an erroneous operation by the user.

Solution to Problem

The present invention adopts the following configurations to solve the above-described problems.

That is, an electrochemical sensor according to one aspect of the present invention is for measuring a concentration ratio between sodium ions and potassium ions in a liquid to be measured that includes a sensor head and a calculation unit. The calculation unit allows performing a calibration operation and a measurement operation. The calibration operation calculates a characteristic parameter of the sensor head based on sensing data of the sensor head in a state where the sensor head is brought into contact with a calibration agent. The measurement operation calculates the concentration ratio based on the characteristic parameter of the sensor head and the sensing data of the sensor head in a state where the sensor head is brought into contact with the liquid to be measured. The sensor head is brought into contact with the calibration agent by coupling the electrochemical sensor to a calibration member. The measurement operation is restricted when the electrochemical sensor is coupled to the calibration member. The calibration operation is restricted when the electrochemical sensor is not coupled to the calibration member.

In the configuration, the measurement operation is restricted when the calibration member and the electrochemical sensor are coupled for bringing the sensor head into contact with the calibration agent, and the calibration operation is restricted when the calibration member and the electrochemical sensor are not coupled. For this reason, it is possible to suppress an operation unintended by the user due to an erroneous operation by a user, such as the measurement operation being performed in a state where the sensor head is brought into contact with the calibration agent or the calibration operation being performed in a state where the sensor head is not in contact with the calibration agent.

In the electrochemical sensor according to the one aspect, the calibration operation may be allowed to be performed when the electrochemical sensor is coupled to the calibration member. The measurement operation may be allowed to be performed when the electrochemical sensor is not coupled to the calibration member. According to this configuration, the calibration operation can be performed in a state where the sensor head is brought into contact with the calibration agent, and the measurement operation can be performed in a state where the sensor head is not brought into contact with the calibration agent.

The electrochemical sensor according to the one aspect includes a calibration switch and a measurement switch. The calibration switch causes the calculation unit to perform the calibration operation. The measurement switch causes the calculation unit to perform the measurement operation. The measurement switch is inoperable when the electrochemical sensor is coupled to the calibration member. The calibration switch is inoperable when the electrochemical sensor is not coupled to the calibration member. According to this configuration, the measurement operation can be restricted in a state where the sensor head is brought into contact with the calibration agent, and the calibration operation can be restricted in a state where the sensor head is not brought into contact with the calibration agent. "Inoperable" is a state in which, for example, an operation cannot be performed by a normal method.

In the electrochemical sensor according to the one aspect, the calibration switch is operable when the electrochemical sensor is coupled to the calibration member. The measurement switch is operable when the electrochemical sensor is not coupled to the calibration member. According to this configuration, the calibration operation can be performed in a state where the sensor head is brought into contact with the calibration agent, and the measurement operation can be performed in a state where the sensor head is not brought into contact with the calibration agent.

In the electrochemical sensor according to the one aspect, the calibration member may be a calibration holder that holds the electrochemical sensor in a state where the sensor head is brought into contact with the calibration agent. According to this configuration, the measurement operation is restricted by holding the electrochemical sensor in the calibration holder, and the calibration operation is restricted by removing the electrochemical sensor from the calibration holder after the calibration operation. Further, the user does not need to hold the electrochemical sensor by himself/herself, thereby facilitating an operation of the calibration switch.

In the electrochemical sensor according to the one aspect, the calibration holder may include a housing portion that houses the calibration agent. The electrochemical sensor may be held in a state where the sensor head is brought into contact with the calibration agent housed in the housing portion. According to this configuration, by holding the electrochemical sensor in the calibration holder, the sensor head comes into contact with the calibration agent, and the measurement operation is restricted.

In the electrochemical sensor according to the one aspect, the calibration holder may include a switch for operating the calibration switch of the held electrochemical sensor from an outside of the calibration holder. According to this configuration, by holing the electrochemical sensor in the calibration holder, the calibration switch can be operated from the outside of the calibration holder.

In the electrochemical sensor according to the one aspect, the calibration holder may include a shielding portion that shields the measurement switch of the held electrochemical sensor. According to this configuration, the measurement switch can be made inoperable in a state where the electrochemical sensor is held by the calibration holder.

In the electrochemical sensor according to the one aspect, the calibration holder may include an operation unit that operates the calibration switch by holding the electrochemical sensor. According to this configuration, by holding the electrochemical sensor in the calibration holder, the sensor head comes into contact with the calibration agent, the measurement operation is restricted, and the calibration operation is performed.

In the electrochemical sensor according to the one aspect, the operation unit may be a magnet. The calibration switch may be a magnetic switch. According to this configuration, the electrochemical sensor and the calibration holder can be easily designed to be waterproof.

In the electrochemical sensor according to the one aspect, the sensor head is brought into contact with the liquid to be measured by coupling the electrochemical sensor to the measurement holder. According to this configuration, by holding the electrochemical sensor in the measurement holder, the sensor head comes into contact with the liquid to be measured, and the user does not need to hold the electrochemical sensor by himself/herself, thereby facilitating the operation of the measurement switch.

In the electrochemical sensor according to the one aspect, the measurement holder may include a switch for operating the measurement switch of the held electrochemical sensor from an outside of the measurement holder. According to this configuration, by holding the electrochemical sensor in the measurement holder, the measurement switch can be operated from the outside of the measurement holder.

In the electrochemical sensor according to the one aspect, the measurement holder may include a shielding portion that shields the calibration switch of the held electrochemical sensor. According to this configuration, the calibration switch can be made inoperable in a state where the electrochemical sensor is held in the measurement holder.

In the electrochemical sensor according to the one aspect, the sensor head may include a sodium ion selective electrode that selectively reacts with sodium ions and a potassium ion selective electrode that selectively reacts with potassium ions. The sensing data of the sensor head may be a potential difference between the sodium ion selective electrode and the potassium ion selective electrode.

A measuring device according to one aspect of the present invention includes the electrochemical sensor and the calibration member.

Advantageous Effects of Invention

According to the present invention, it is possible to provide a technology that can suppress an operation unintended by a user caused by an erroneous operation by the user.

DESCRIPTION OF EMBODIMENTS

Respective embodiments according to an aspect of the present invention will be described below based on the drawings.

First Embodiment

Configuration of Electrochemical Sensor 90 as Example of Embodiment

Figure 1:
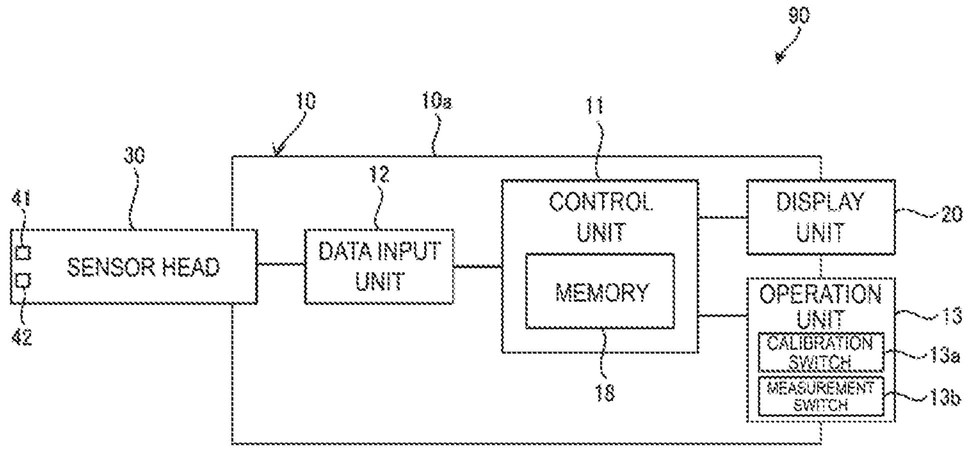
FIG. 1 is a diagram illustrating a configuration of an electrochemical sensor 90 as an example of an embodiment.

FIG. 1 is a diagram illustrating a configuration of the electrochemical sensor 90 as an example of an embodiment. The electrochemical sensor 90 is a sensor that measures a concentration ratio between sodium ions ($Na^+$) and potassium ions ($K^+$) in a liquid to be measured (for example, human urine). The electrochemical sensor 90 includes a sensor head 30 and a body 10 having a case 10*a*. A control unit 11, a data input unit 12, an operation unit 13, and a display unit 20 are mounted on the body 10.

The electrochemical sensor 90 is configured as a handheld device used by a user holding the body 10 by the hand. The body 10 has, for example, an elongated prismatic outer shape to be grasped by the user's hand.

The sensor head 30 has, for example, a substantially rectangular plate-like outer shape. The sensor head 30 has a sodium ion selective electrode 41 that selectively reacts with sodium ions and a potassium ion selective electrode 42 that selectively reacts with potassium ions at a distal end portion. A specific example of the configuration of the sensor head 30 will be described later (for example, see FIG. 22 to FIG. 25).

The data input unit 12 inputs respective potentials (or a potential difference) of the sodium ion selective electrode 41 and the potassium ion selective electrode 42 of the sensor head 30.

The control unit 11 controls the overall operation of the electrochemical sensor 90 and performs a calculation process. In addition, the control unit 11 includes a memory 18 that temporarily stores the respective potentials of the sodium ion selective electrode 41 and the potassium ion selective electrode 42 input by the data input unit 12 and characteristic parameters related to the sodium ion selective electrode 41 and the potassium ion selective electrode 42 described later.

The control unit 11 is achieved by, for example, a processor and a memory that operate in cooperation. The processor is, for example, a processor, such as a central processing unit (CPU) or a micro processing unit (MPU). The processor operates as the control unit 11 by reading and executing a program stored in the memory. Note that the processor may be a combination of a plurality of processors.

The memory is achieved by a random access memory (RAM), a read only memory (ROM), a flash memory, or the like. The memory stores programs to be executed by the processor, data to be used by the processor, or the like. The memory 18 is constituted by a RAM, for example.

The control unit 11 is an example of a calculation unit that allows performing a calibration operation and a measurement operation. The calibration operation is an operation of calculating the characteristic parameter of the sensor head 30 based on sensing data of the sensor head 30 in a state where the sensor head 30 is brought into contact with a calibration solution. The calibration solution is an example of a calibration agent in which a concentration ratio between sodium ions and potassium ions is known.

The sensing data of the sensor head 30 is, for example, the respective potentials of the sodium ion selective electrode 41 and the potassium ion selective electrode 42. The characteristic parameters of the sensor head 30 are, for example, respective parameters related to the sodium ion selective electrode 41 and the potassium ion selective electrode 42. The characteristic parameter will be described later.

The measurement operation is an operation of calculating the concentration ratio between sodium ions and potassium ions in the liquid to be measured based on the characteristic parameter of the sensor head 30 calculated by the calibration operation and the sensing data of the sensor head 30 in a state where the sensor head 30 is brought into contact with the liquid to be measured. The calculation of the concentration ratio between the sodium ions and the potassium ions in the liquid to be measured will be described later.

The operation unit 13 is a user interface to receive an operation from the user. The operation unit 13 includes, for example, a power switch (for example, a power switch 13*c* in FIG. 2) of the electrochemical sensor 90. The operation unit 13 includes a calibration switch 13*a* for causing the control unit 11 to perform the calibration operation and a measurement switch 13*b* for causing the control unit 11 to perform the measurement operation.

The display unit 20 is a user interface that displays various types of information, such as calculation results by the control unit 11. The display unit 20 is configured by a liquid crystal display (LCD), for example.

When the calibration switch 13*a* is operated, the control unit 11 performs the calibration operation and stores the characteristic parameter of the sensor head 30 calculated by the calibration operation in the memory 18. When the measurement switch 13*b* is operated, the control unit 11 performs the measurement operation using the characteristic parameter of the sensor head 30 stored in the memory 18, and performs control to display the concentration ratio calculated by the measurement operation on the display unit 20.

First, the user brings the calibration solution into contact with the sensor head 30 and operates the calibration switch 13*a* in this state. Thus, the calibration operation of the electrochemical sensor 90 is performed. Next, the user separates the sensor head 30 from the calibration solution, and discards the calibration solution. Then, the user brings the liquid to be measured into contact with the sensor head 30, and operates the measurement switch 13*b* in this state. Accordingly, the measurement operation of the electrochemical sensor 90 is performed, and the concentration ratio measured by the measurement operation is displayed on the display unit 20.

External Configuration of Electrochemical Sensor 90

Figure 2:
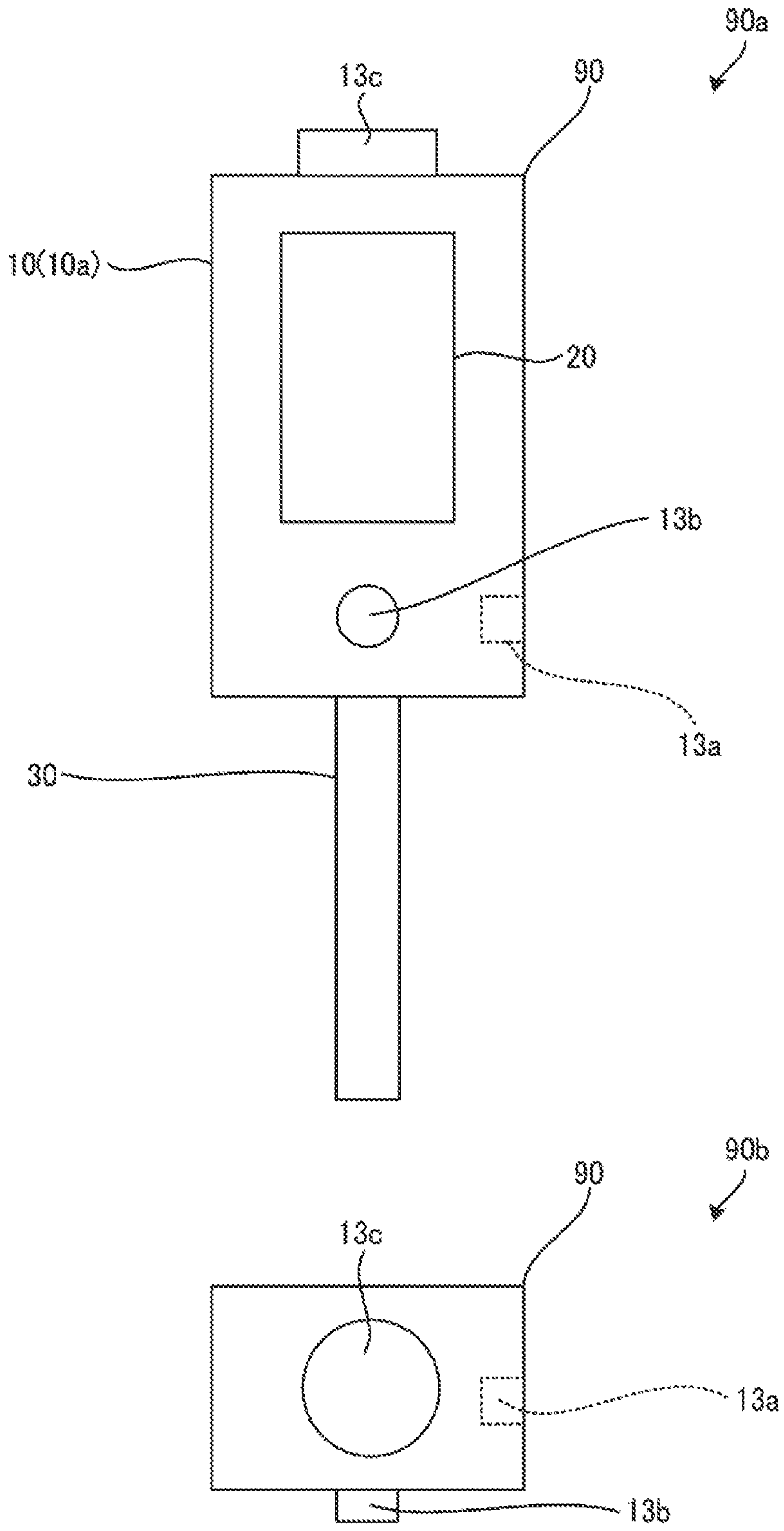
FIG. 2 is a diagram illustrating an example of an external configuration of the electrochemical sensor 90.

FIG. 2 is a diagram illustrating an example of the external configuration of the electrochemical sensor 90. A front surface 90*a* is a front surface of the electrochemical sensor 90. An upper surface 90*b* is an upper surface of the electrochemical sensor 90. In the example of FIG. 2, the calibration switch 13*a*, the measurement switch 13*b*, the power switch 13*c*, and the display unit 20 are provided on the case 10*a*. In the example of FIG. 2, each of the calibration switch 13*a*, the measurement switch 13*b*, and the power switch 13*c* is a press switch (press button).

To be specific, the calibration switch 13*a* is provided on a side surface of the case 10*a*. The calibration switch 13*a* is a press-switch that does not protrude from the case 10*a* and is sufficiently small with respect to a finger of the user or the like, and therefore it is difficult for the user to press the calibration switch 13*a* with a finger or the like. The calibration switch 13*a* can take various forms as long as it is difficult for the user to press the calibration switch 13*a* with a finger or the like. For example, when the calibration switch 13*a* is recessed with respect to the case 10*a*, it is difficult for the user to press the calibration switch 13*a* with a finger or the like even when the calibration switch 13*a* is large to some extent.

The measurement switch 13*b* is provided on the front surface of the case 10*a*. The measurement switch 13*b* is a press switch that protrudes from the case 10*a* and can be easily pressed by the user with a finger or the like. The power switch 13*c* is provided on the upper surface of the case 10*a*. The power switch 13*c* is a press switch that protrudes from the case 10*a* and can be easily pressed by the user with a finger or the like.)

Calibration Holder 60 Holding Electrochemical Sensor 90

Figure 3:
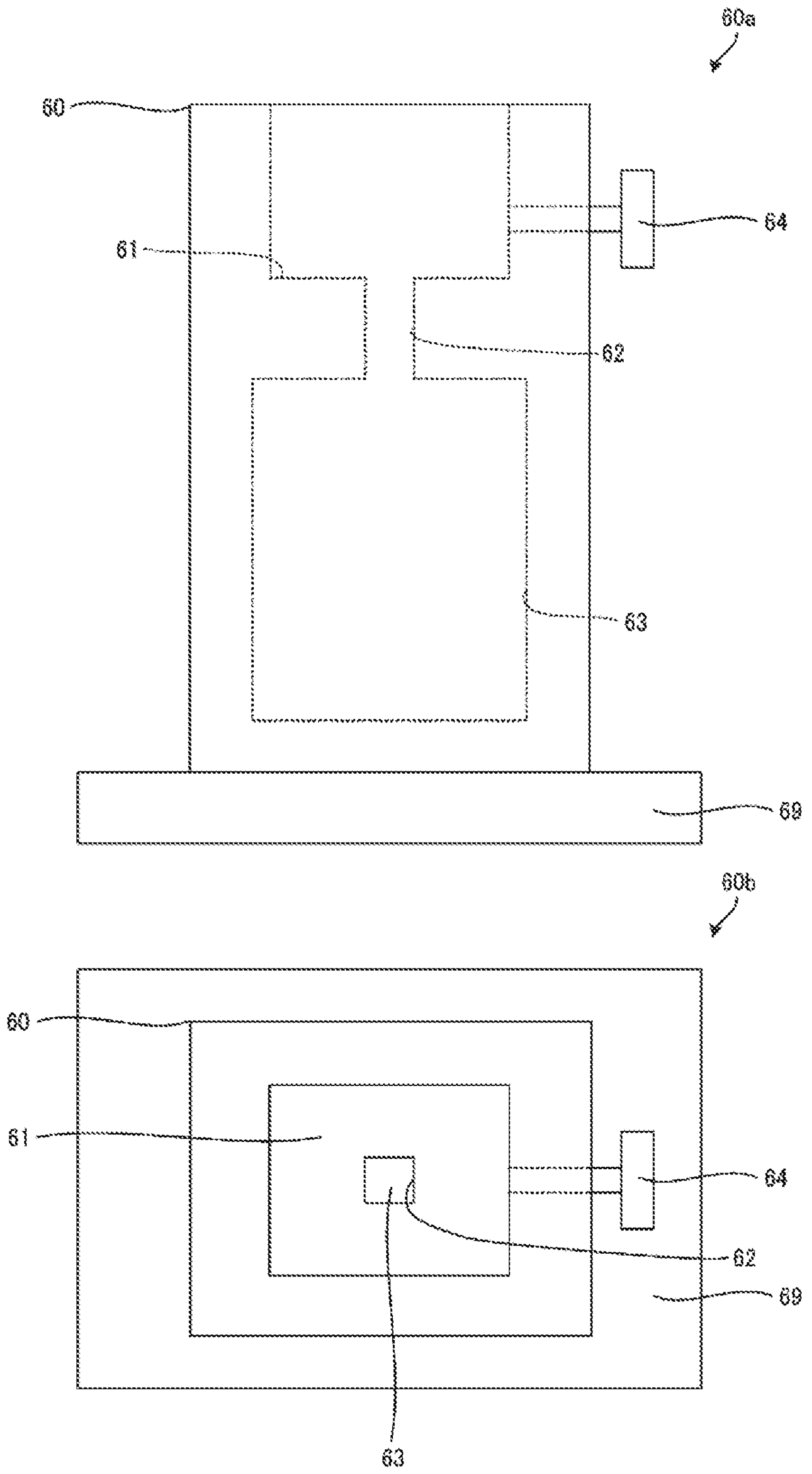
FIG. 3 is a diagram illustrating an example of a calibration holder 60 holding the electrochemical sensor 90.

FIG. 3 is a diagram illustrating an example of the calibration holder 60 holding the electrochemical sensor 90. A front surface 60*a* is a front surface of the calibration holder 60. An upper surface 60*b* is an upper surface of the calibration holder 60. The calibration holder 60 is an example of a calibration member. The calibration holder 60 illustrated in FIG. 3 is a stand-type calibration holder that holds the electrochemical sensor 90 with the sensor head 30 brought into contact with the calibration solution. The calibration holder 60 includes a holding portion 61, a sensor head insertion hole 62, a housing portion 63, a switch 64, and a base 69.

The holding portion 61 is a hole having a shape that allows holding a distal end portion (a portion on the side where the sensor head 30 is provided) of the case 10*a* of the electrochemical sensor 90. In this example, since the case 10*a* of the electrochemical sensor 90 has a substantially quadrangular prism shape, the holding portion 61 is also a hole having a substantially quadrangular prism shape. Further, the holding portion 61 has a bottom portion that supports the case 10*a* from below.

The sensor head insertion hole 62 is a hole that is electrically connected to the housing portion 63 from the bottom portion of the holding portion 61 and has a shape into which the sensor head 30 of the electrochemical sensor 90 can be inserted. In this example, since the sensor head 30 of the electrochemical sensor 90 has a substantially quadrangular prism shape, the sensor head insertion hole 62 is also a hole having a substantially quadrangular prism shape.

The housing portion 63 is a housing portion for housing the calibration solution. The housing portion 63 is a sealed space except for a portion electrically connected to the sensor head insertion hole 62.

The switch 64 is a press switch for operating the calibration switch 13*a* of the held electrochemical sensor 90 from the outside of the calibration holder 60. Specifically, the switch 64 is provided on a side surface of a portion of the calibration holder 60 where the holding portion 61 is provided. The switch 64 is a press switch that protrudes to the outside from the side surface of the calibration holder 60 and can be easily pressed by the user with a finger or the like.

A portion of the calibration holder 60 where the switch 64 is provided is provided with a hole electrically connected from the outside of the calibration holder 60 to the holding portion 61, and the switch 64 is provided with a pin that is slidable in the hole. When the switch 64 is pressed down, the distal end of the pin enters the inside of the holding portion 61.

The base 69 is a member provided at the bottom portion of the calibration holder 60 and having a flat bottom surface. The calibration holder 60 can be stably installed on a flat place, such as a desk, by the base 69.

Figure 4:
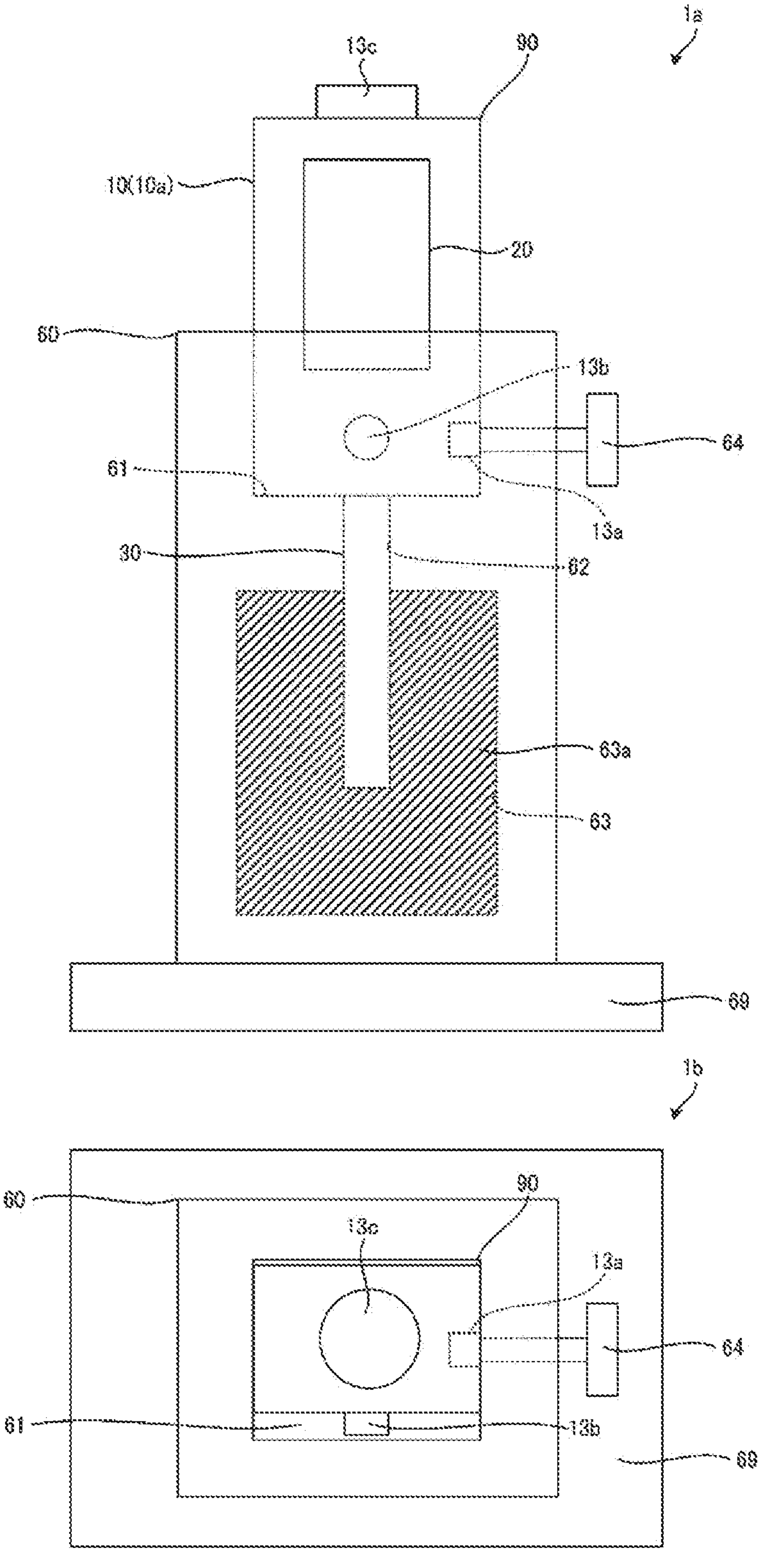
FIG. 4 is a diagram illustrating an example of a state of the electrochemical sensor 90 and the calibration holder 60 during a calibration operation.

State of Electrochemical Sensor 90 and Calibration Holder 60 during Calibration Operation FIG. 4 is a diagram illustrating an example of the state of the electrochemical sensor 90 and the calibration holder 60 during the calibration operation. A front surface 1*a* is a front surface of the electrochemical sensor 90 and the calibration holder 60 coupled to one another. An upper surface 1*b* is an upper surface of the electrochemical sensor 90 and the calibration holder 60 coupled to one another.

When a calibration solution 63*a* is put into the housing portion 63 of the calibration holder 60 and the electrochemical sensor 90 is installed in the calibration holder 60, for example, the state becomes as illustrated in FIG. 4. The installation of the electrochemical sensor 90 to the calibration holder 60 is an example of the coupling between the calibration holder 60 (calibration member) and the electrochemical sensor 90.

In the state illustrated in FIG. 4, the distal end portion of the case 10*a* is held by the holding portion 61 in a state where the distal end portion of the sensor head 30 (the portion where the sodium ion selective electrode 41 and the potassium ion selective electrode 42 are exposed) is in contact with the calibration solution 63*a* in the housing portion 63 via the sensor head insertion hole 62. Accordingly, for example, even when the user releases the hand from the electrochemical sensor 90, the electrochemical sensor 90 is held in a state where the sensor head 30 is brought into contact with the calibration solution 63*a*.

Further, in the state of FIG. 4, the measurement switch 13*b* of the electrochemical sensor 90 is shielded from the outside by a sidewall portion of the holding portion 61. That is, the sidewall portion of the holding portion 61 is an example of a shielding portion that shields the measurement switch 13*b* of the electrochemical sensor 90 held by the calibration holder 60. Since the measurement switch 13*b* is shielded, it becomes difficult for the user to press the measurement switch 13*b* with a finger or the like.

On the other hand, in the state of FIG. 4, when the switch 64 is pressed down, the calibration switch 13*a* is pressed by the distal end of the pin provided on the switch 64. Therefore, the user can easily press the calibration switch 13*a* by pressing the switch 64 with a finger or the like.

That is, in the state of FIG. 4 (when the electrochemical sensor 90 and the calibration holder 60 are coupled), the calibration switch 13*a* is operable and the measurement switch 13*b* is inoperable. "Operable" is a state in which an operation can be easily performed by a normal method (for example, pressing with a finger). "Inoperable" is a state in which the operation cannot be performed by the normal method (a state in which the operation is difficult).

As a result, the user can easily cause the electrochemical sensor 90 to perform the calibration operation by pressing the switch 64, and it can be suppressed that the electrochemical sensor 90 performs the measurement operation by erroneously pressing the measurement switch 13*b* by the user.

State of Electrochemical Sensor 90 During Measurement Operation

Figure 5:
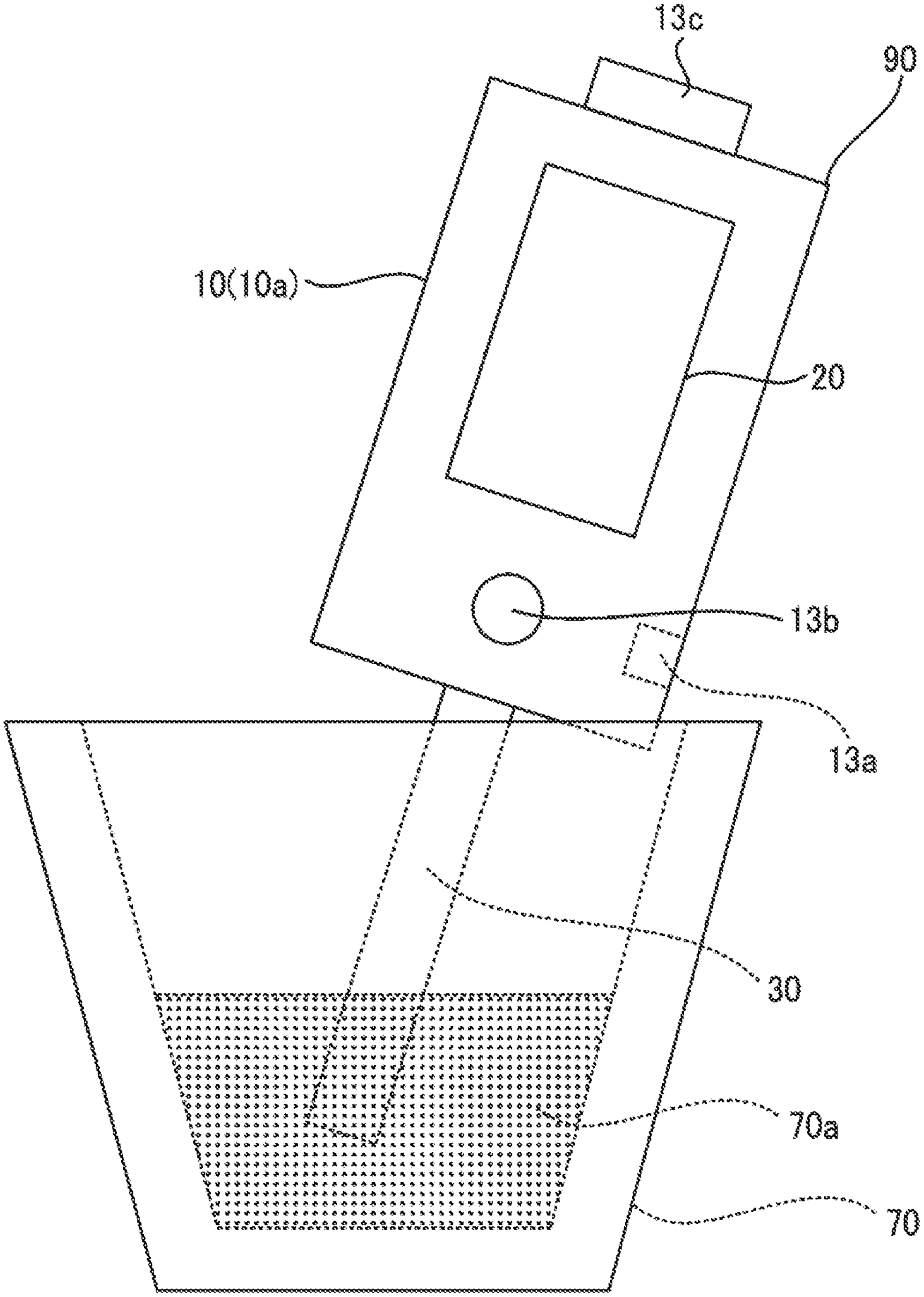
FIG. 5 is a diagram illustrating an example of a state of the electrochemical sensor 90 during a measurement operation.

FIG. 5 is a diagram illustrating an example of the state of the electrochemical sensor 90 during the measurement operation. When the measurement operation in the state illustrated in FIG. 4 is completed, the user takes out the electrochemical sensor 90 from the calibration holder 60 and as illustrated in FIG. 5, holds the electrochemical sensor 90 such that the sensor head 30 comes into contact with a liquid to be measured 70*a* contained in a container 70.

Then, the user presses the measurement switch 13*b*. In the state of FIG. 5, since the measurement switch 13*b* is not shielded, the user can easily press the measurement switch 13*b*. On the other hand, since the calibration switch 13*a* is provided so as not to protrude from the case 10*a* as described above, the user cannot easily press the measurement switch 13*b* in the state of FIG. 5. That is, in the state of FIG. 5 (when the electrochemical sensor 90 and the calibration holder 60 are not coupled), the measurement switch 13*b* is operable and the calibration switch 13*a* is inoperable.

Thus, the user can press the measurement switch 13*b* to cause the electrochemical sensor 90 to easily perform the measurement operation, and it can be suppressed that the user erroneously presses the calibration switch 13*a* and the electrochemical sensor 90 performs the calibration operation.

As described above, in the electrochemical sensor 90, the sensor head 30 is brought into contact with the calibration solution 63*a* by the coupling between the electrochemical sensor 90 and the calibration holder 60 (calibration member), the measurement switch 13*b* is inoperable when the electrochemical sensor 90 and the calibration holder 60 are coupled, and the calibration switch 13*a* is inoperable when the electrochemical sensor 90 and the calibration holder 60 are not coupled. Accordingly, the measurement operation is restricted when the electrochemical sensor 90 and the calibration holder 60 are coupled, and the calibration operation is restricted when the electrochemical sensor 90 and the calibration holder 60 are not coupled.

For this reason, it is possible to suppress an operation unintended by the user due to an erroneous operation by the user, such as the measurement operation being performed in a state where the sensor head 30 is brought into contact with the calibration solution 63*a* or the calibration operation being performed in a state where the sensor head 30 is not in contact with the calibration solution 63*a*.

For example, it is possible to suppress that the user erroneously operates the measurement switch 13*b* in a state where the sensor head 30 is brought into contact with the calibration solution 63*a*, the measurement operation is performed in a state where the calibration is not correctly performed, and an accurate measurement value is not obtained. In addition, it is possible to suppress that the user erroneously operates the calibration switch 13*a* in a state where the sensor head 30 is brought into contact with the liquid to be measured 70*a*, inaccurate calibration is performed with reference to the liquid to be measured 70*a*, and an accurate measurement value is not obtained in the subsequent measurement.

Measurement Method

In the electrochemical sensor 90, the concentration ratio between the sodium ions and the potassium ions in the liquid to be measured 70*a* is obtained by the following principle.

First, ion selective electrodes, such as the sodium ion selective electrode 41 and the potassium ion selective electrode 42, generally exhibit a response proportional to a logarithm of an activity of chemical species according to the Nernst equation as in Equation (1).

[Equation 1]

$$E_w = E^\circ + \frac{2.303\ RT}{nF}\log(r \cdot C) \quad (1)$$

Here, $E_w$ represents a potential [V] of a working electrode, $E^0$ represents a formal potential [V] specific to each electrode, R represents a gas constant (=8.314 [J/K·mol]), T represents an absolute temperature [K], n represents an ion valence, F represents a Faraday constant (~96485 [C/mol]), r represents an activity coefficient representing an ion concentration of the entire solution, and C represents an ion concentration [mol/L] of a measurement target.

Here, the electrode potentials of the sodium ion selective electrode 41 and the potassium ion selective electrode 42 are represented by $E_{w1}$ and $E_{w2}$, respectively, and the formal potentials thereof are represented as follows.

[Equation 2]

$$E_1^\circ, E_2^\circ$$

The concentrations of sodium ions and potassium ions as the measurement targets by the sodium ion selective electrode 41 and the potassium ion selective electrode 42 are represented by $C_1$ and $C_2$, respectively. In addition, sensitivities of the sodium ion selective electrode 41 and the potassium ion selective electrode 42 are represented by $S_1$ and $S_2$ as values including the activity coefficient. Note that response sensitivities of the sodium ion selective electrode 41 and the potassium ion selective electrode 42 are theoretically $S_1=S_2=59.2$ when the measurement target is monovalent ions and a temperature is 25° C., but actually differ due to variations in a film and influence of deterioration and elution of a sensitive substance, and therefore are values of $S_1$ and $S_2$ including the respective activity coefficients as described above. Influence quantities of interfering substances on the potentials at the sodium ion selective electrode 41 and the potassium ion selective electrode 42 (corresponding to the selectivity of the respective ion selective electrodes) are represented by $k_1$ and $k_2$. Then, the electrode potentials $E_{w1}$ and $E_{w2}$ are shown by Equations (2) and (3), respectively.

[Equation 3]

$$E_{W1} = E_1 + S_1\log(C_1) + k_i \quad (2)$$

[Equation 4]

$$E_{W2} = E_2 + S_2\log(C_2) + k_2 \quad (3)$$

Here, a difference (sensitivity difference) between the sensitivity of the sodium ion selective electrode 41 and the sensitivity of the potassium ion selective electrode 42 is represented by a as shown in Equation (4).

$$S_2=S_1-\alpha \quad (4)$$

Then, a difference (potential difference) $\Delta$ E between the electrode potential of the sodium ion selective electrode 41 and the electrode potential of the potassium ion selective electrode 42 is represented by Equation (5).

[Equation 5]

$$\begin{aligned}\Delta E &= E_{w1} - E_{w2} \quad (5)\\ &= E_1^{\circ} - E_2^{\circ} + S_1\log(C_1) - (S_1 - \alpha)\log(C_2) + k_1 - k_2\\ &= E_1^{\circ} - E_2^{\circ} + S_1\log\left(\frac{C_1}{C_2}\right) + \alpha\log(C_2) + k_1 - k_2\end{aligned}$$

Here, the sensitivities $S_1$ and $S_2$ of the sodium ion selective electrode 41 and the potassium ion selective electrode 42 and the influence quantities $k_1$ and $k_2$ (corresponding to the selectivity of the respective ion selective electrodes) on the potentials by the interfering substances in the sodium ion selective electrode 41 and the potassium ion selective electrode 42 can be made equal to one another, for example, by setting materials of a sodium ion selective membrane **41*i* and a potassium ion selective membrane 42*i* described later. When the sensitivity $S_1$ and the selectivity $k_1$ of the sodium ion selective electrode 41 are thus made equal to the sensitivity $S_2$ and the selectivity $k_2$ of the potassium ion selective electrode 42**, respectively, they can be substantially regarded as Equations (6) and (7).

$$\alpha=S_1-S_2=0 \quad (6)$$

$$k_1=k_2 \quad (7)$$

As a result, Equation (5) is simplified to the following Equation (8).

[Equation 6]

$$\Delta E = E_1^{\circ} - E_2^{\circ} + S_1\log\left(\frac{C_1}{C_2}\right) \quad (8)$$

This equation shows that a concentration ratio $M_s(=C_1/C_2)$ between the sodium ions and the potassium ions in the liquid to be measured **70*a* can be measured when $\Delta$ E of the solution (calibration solution 63*a***) having the known concentration ratio between the sodium ions and the potassium ions is measured and the following constant $V^0$ and the sensitivity $S_1$ are obtained in advance. The constant $V^0$ is defined as follows.

[Equation 7]

$$E_1^{\circ} - E_2^{\circ}$$

In particular, the sensitivity $S_1$ is assumed to be constant in a lot of the manufactured sensor heads 30, and a known constant value measured in advance is employed. The constant $V^0$ can be obtained by detecting the potential difference between the sodium ion selective electrode 41 and the potassium ion selective electrode 42 in the calibration solution **63*a*. That is, when the concentration ratio (known) between the sodium ions and the potassium ions in the calibration solution 63*a* is represented by $M_{ref}$ and the potential difference detected for the calibration solution 63*a*** is represented by $V_{ref}$, Expression (9) is obtained from Expression (8).

$$V^0=V_{ref}-S_1\log(M_{ref}) \quad (9)$$

On the other hand, the potential difference between the sodium ion selective electrode 41 and the potassium ion selective electrode 42 is detected for the liquid to be measured **70*a*. When the concentration ratio between sodium ions and potassium ions in the liquid to be measured 70*a* is represented by $M_s$ and the potential difference detected for the liquid to be measured 70*a*** is represented by $V_s$, Expression (10) is obtained from Expression (8).

$$\log M_s=(V_s-V_0)/S_1 \quad (10)$$

Therefore, the concentration ratio $M_s$ between the sodium ions and the potassium ions in the liquid to be measured **70*a*** can be obtained as in Equation (11).

[Equation 8]

$$M_s=10^{\{(V_s-V^0)/S_1\}}=10^{\{(V_s-V_{ref}+S_1\log M_{ref})/S_1\}} \quad (11)$$

That is, in the calibration operation, the control unit 11 calculates the constant $V^0$, the sensitivity $S_1$ of the sodium ion selective electrode 41, and the potential difference $V_{ref}$ detected for the calibration solution **63*a* as the characteristic parameters of the sensor head 30**.

In the measurement operation, the control unit 11 calculates the concentration ratio $M_s$ between the sodium ions and the potassium ions in the liquid to be measured **70*a* based on the potential difference $V_s$ detected for the liquid to be measured 70*a*, the constant $V^0$, the sensitivity $S_1$ of the sodium ion selective electrode 41, the potential difference $V_{ref}$ detected for the calibration solution 63*a*, the known concentration ratio $M_{ref}$ between the sodium ions and the potassium ions in the calibration solution 63*a***, and Equation (11).

Second Embodiment

In the second embodiment, a part different from the first embodiment will be described. In the second embodiment, an example of an operation unit that operates the calibration switch **13*a* by holding the electrochemical sensor 90 by the calibration holder 60** will be described.

Calibration Holder 60 of Second Embodiment

Figure 6:
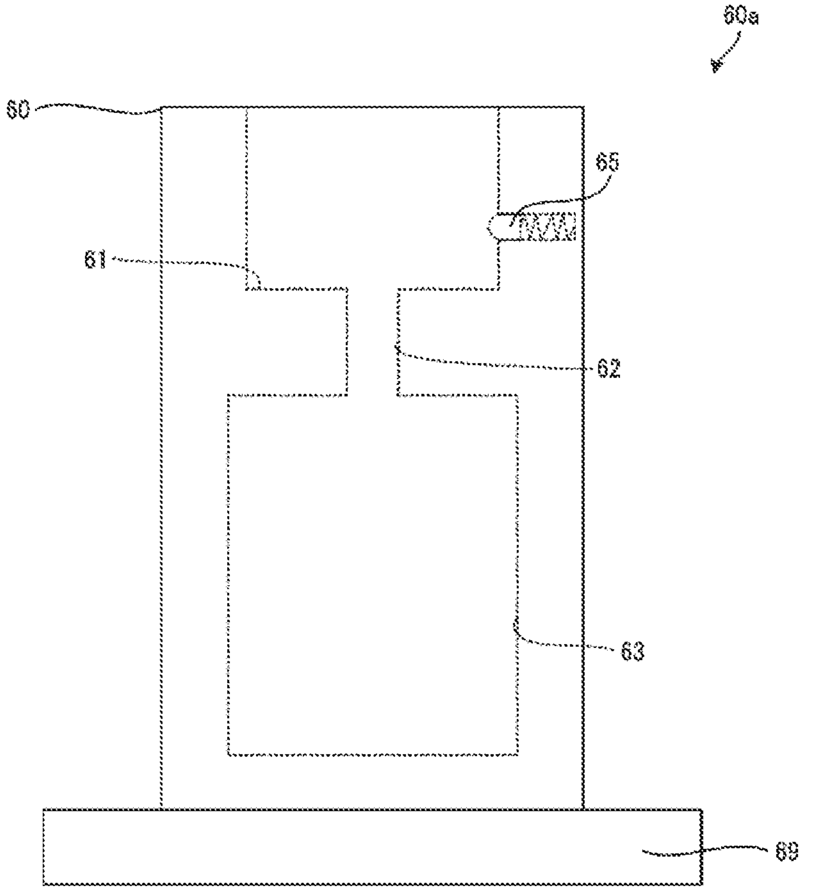
FIG. 6 is a diagram illustrating an example of the calibration holder 60 according to a second embodiment.
Figure 6:
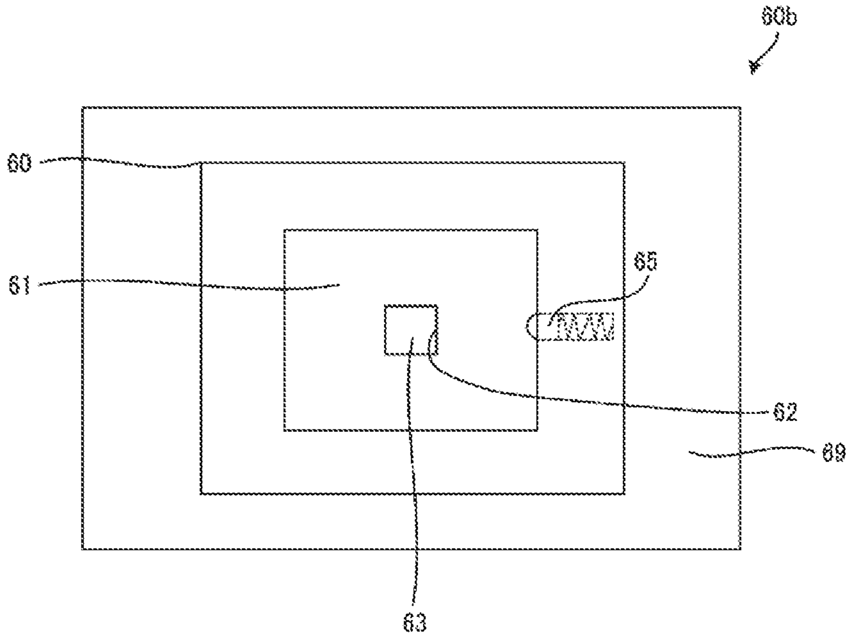

FIG. 6 is a diagram illustrating an example of the calibration holder 60 according to the second embodiment. The calibration holder 60 illustrated in FIG. 6 includes a switch 65 instead of the switch 64 of the calibration holder 60 illustrated in FIG. 3. The switch 65 is an example of the operation unit that operates the calibration switch 13*a* by the calibration holder 60 holding the electrochemical sensor 90.

The switch 65 is provided in a hole provided in an inner side of a sidewall of the holding portion 61, and is biased toward the inside of the holding portion 61 by a spring or the like. As a result, in a state where the electrochemical sensor 90 is not inserted into the holding portion 61, only the distal end portion of the holding portion 61 is exposed to the inside of the holding portion 61.

The distal end portion of the holding portion 61 is inclined with respect to an insertion direction (a vertical direction in FIG. 6) of the electrochemical sensor 90 into the holding portion 61. In the example of FIG. 6, the distal end portion of the holding portion 61 has a hemispherical shape. Thus, the switch 65 does not prevent the electrochemical sensor 90 from being inserted into the holding portion 61.

Figure 7:
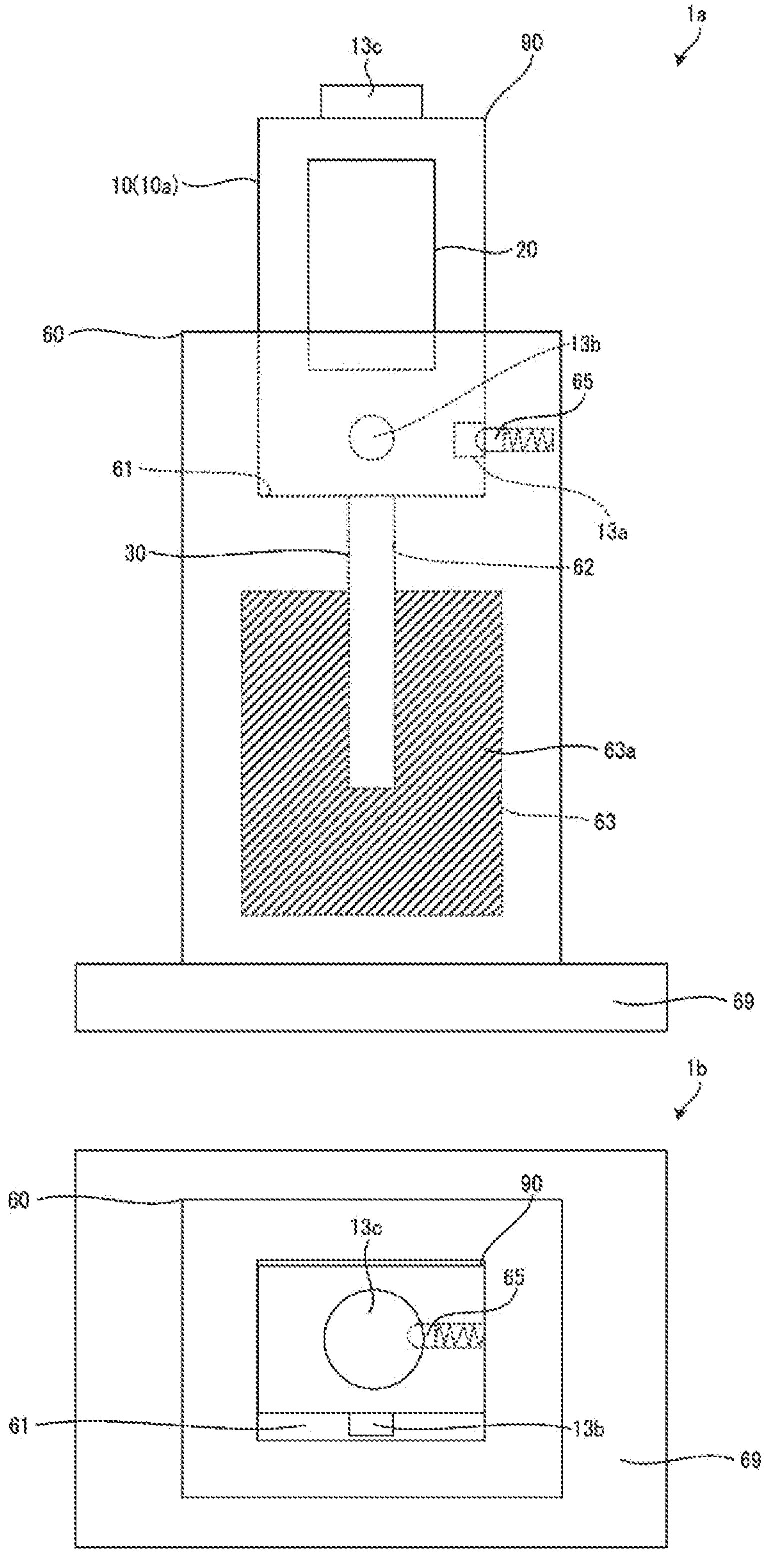
FIG. 7 is a diagram illustrating an example of a state of the electrochemical sensor 90 and the calibration holder 60 during a calibration operation according to the second embodiment.

State of Electrochemical Sensor 90 and Calibration Holder 60 During Calibration Operation of Second Embodiment FIG. 7 is a diagram illustrating an example of the state of the electrochemical sensor 90 and the calibration holder 60 during the calibration operation according to the second embodiment. When the calibration solution 63*a* is put into the housing portion 63 of the calibration holder 60 illustrated in FIG. 6 and the electrochemical sensor 90 is installed in the calibration holder 60, for example, the state becomes as illustrated in FIG. 7.

To be specific, when the electrochemical sensor 90 is installed in the calibration holder 60, the calibration switch 13*a* is pressed by the switch 65. Therefore, the user can easily press the calibration switch 13*a* by installing the electrochemical sensor 90 in the calibration holder 60.

As a result, the user can easily cause the electrochemical sensor 90 to perform the calibration operation by installing the electrochemical sensor 90 in the calibration holder 60, and it can be suppressed that the electrochemical sensor 90 performs the measurement operation by erroneously pressing the measurement switch 13*b* by the user.

Although the calibration operation of the second embodiment has been described, the measurement operation of the second embodiment is performed in the same manner as that of the first embodiment, for example.

Third Embodiment

In the third embodiment, a part different from the first embodiment and the second embodiment will be described. In the second embodiment, an example of a calibration switch, which is different from the calibration switch 13*a*, for causing the control unit 11 to perform the calibration operation will be described.

Electrochemical Sensor 90 of Third Embodiment

Figure 8:
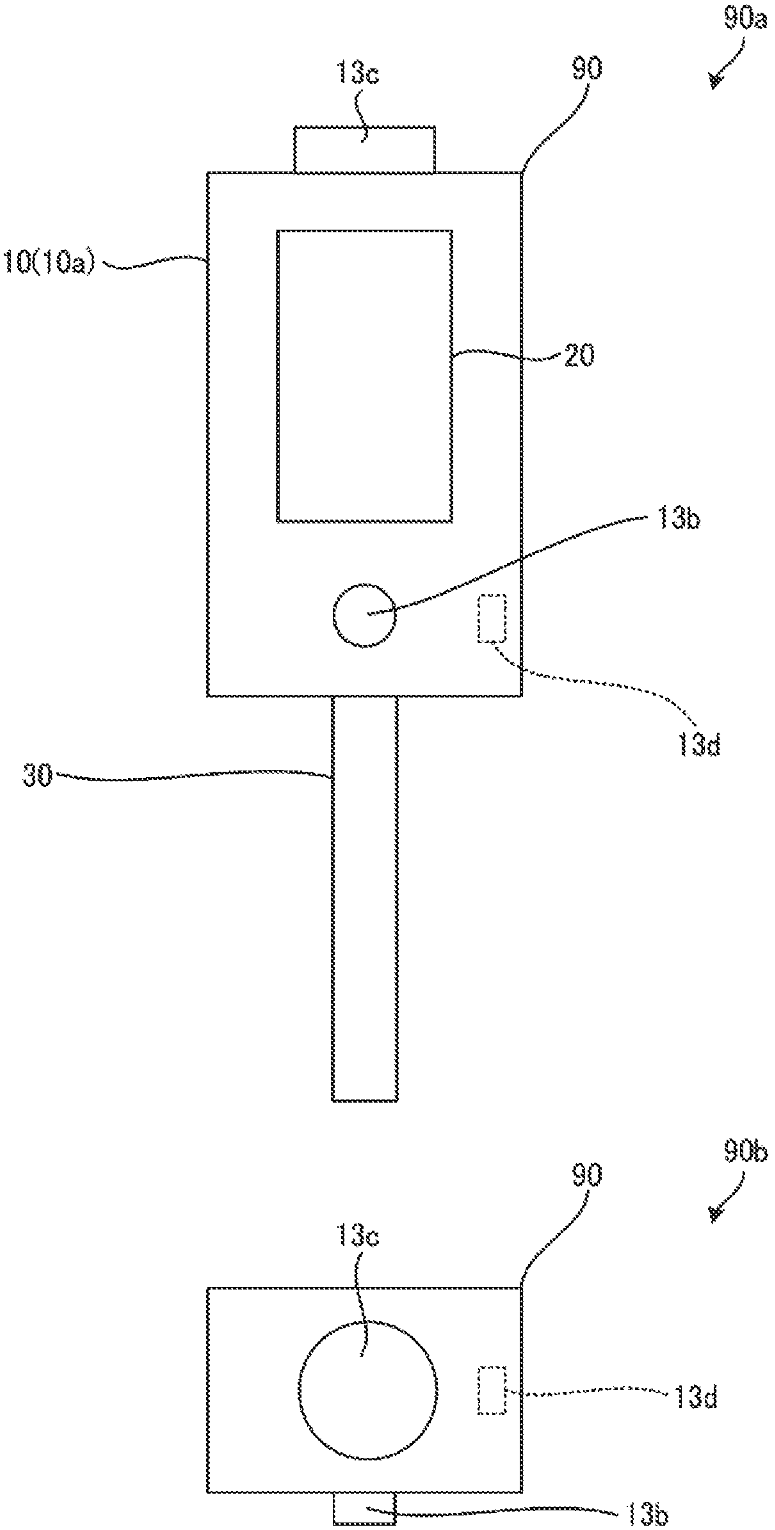
FIG. 8 is a diagram illustrating an example of the electrochemical sensor 90 according to a third embodiment.

FIG. 8 is a diagram illustrating an example of the electrochemical sensor 90 according to the third embodiment. The electrochemical sensor 90 illustrated in FIG. 8 includes a magnetic switch 13*d* instead of the calibration switch 13*a* of the electrochemical sensor 90 illustrated in FIG. 2. The magnetic switch 13*d* is an example of a calibration switch for causing the control unit 11 to perform the calibration operation. The magnetic switch 13*d* is a magnetic proximity switch that outputs a detection signal when detecting magnetism. When the detection signal is output from the magnetic switch 13*d*, the control unit 11 performs the calibration operation.

Calibration Holder 60 of Third Embodiment

Figure 9:
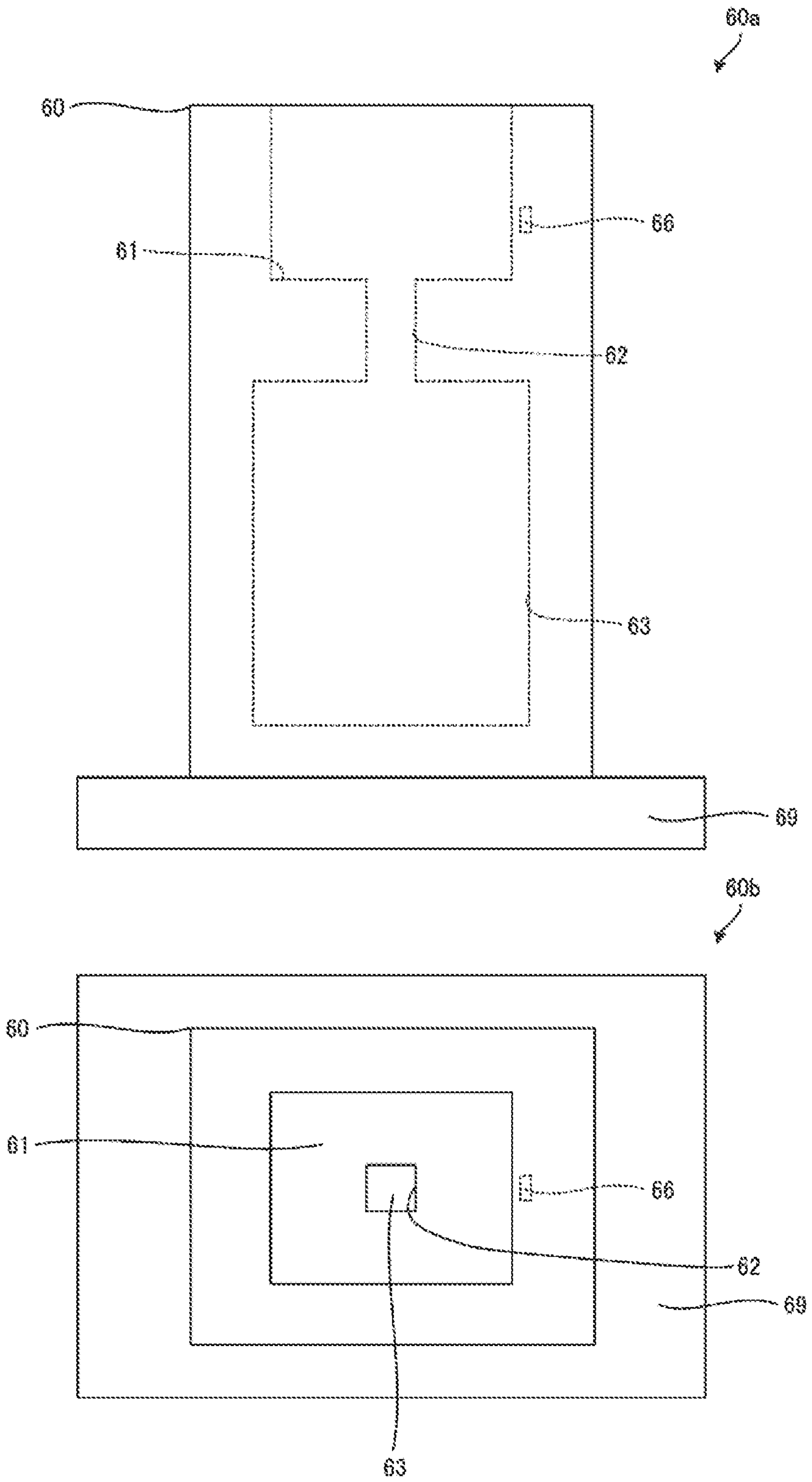
FIG. 9 is a diagram illustrating an example of the calibration holder 60 according to the third embodiment.

FIG. 9 is a diagram illustrating an example of the calibration holder 60 according to the third embodiment. The calibration holder 60 illustrated in FIG. 9 includes a magnet 66 instead of the switch 64 of the calibration holder 60 illustrated in FIG. 3. The magnet 66 is embedded in the sidewall portion of the holding portion 61. To be specific, the magnet 66 is provided at a position close to the magnetic switch 13*d* of the electrochemical sensor 90 when the electrochemical sensor 90 is held by the holding portion 61. The magnet 66 is an example of the operation unit that operates the calibration switch (the magnetic switch 13*d* of the electrochemical sensor 90) by the calibration holder 60 holding the electrochemical sensor 90.

Figure 10:
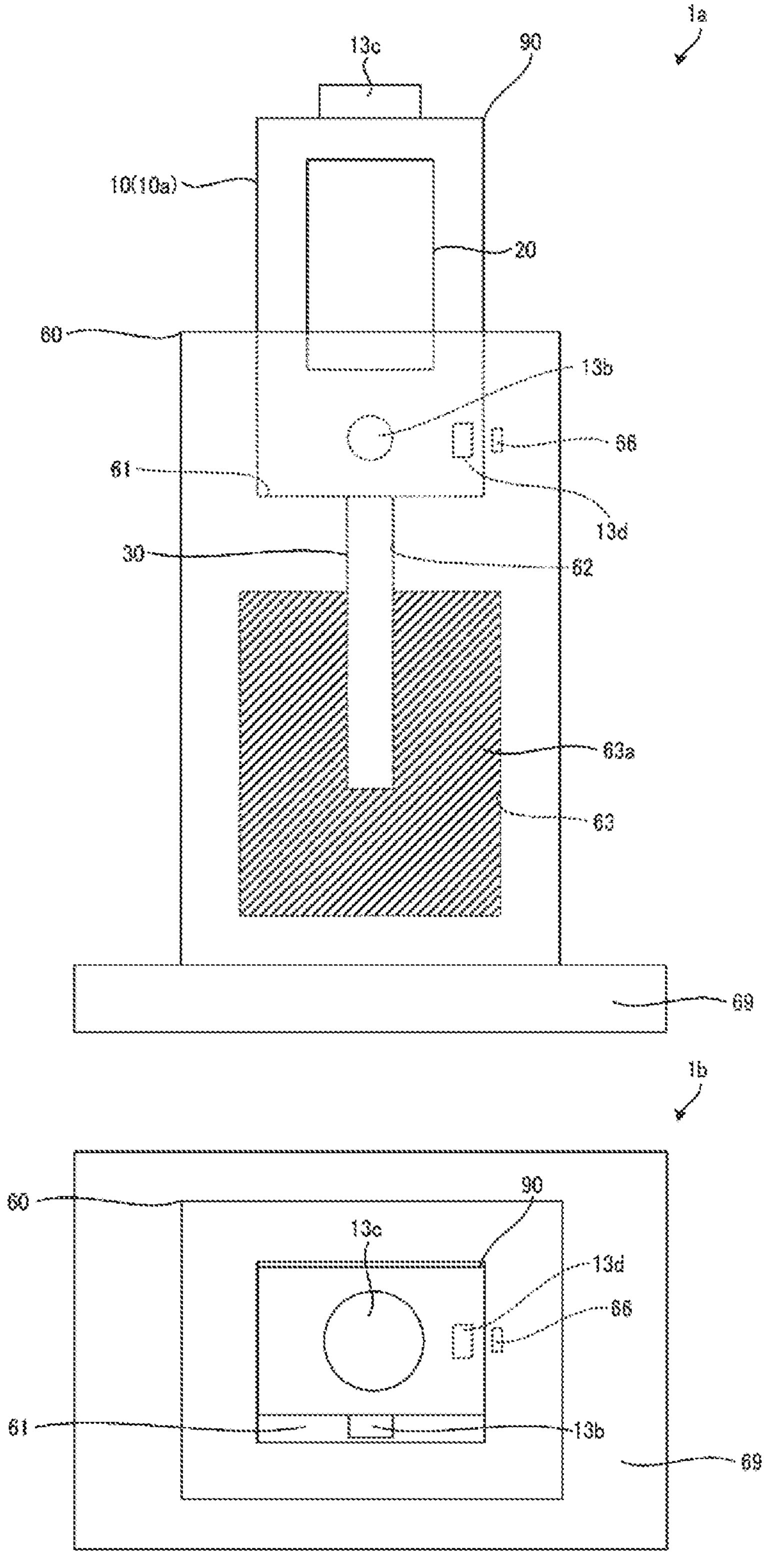
FIG. 10 is a diagram illustrating an example of a state of the electrochemical sensor 90 and the calibration holder 60 during a calibration operation according to the third embodiment.

State of Electrochemical Sensor 90 and Calibration Holder 60 During Calibration Operation of Third Embodiment FIG. 10 is a diagram illustrating an example of the state of the electrochemical sensor 90 and the calibration holder 60 during the calibration operation according to the third embodiment. When the calibration solution 63*a* is put into the housing portion 63 of the calibration holder 60 illustrated in FIG. 9 and the electrochemical sensor 90 illustrated in FIG. 8 is installed in the calibration holder 60, for example, the state becomes as illustrated in FIG. 10.

To be more specific, when the electrochemical sensor 90 is installed in the calibration holder 60, the magnet 66 of the calibration holder 60 comes close to the magnetic switch 13*d* of the electrochemical sensor 90. As a result, the detection signal is output from the magnetic switch 13*d*, and the calibration operation is performed by the control unit 11. Therefore, the user can easily perform the calibration operation by installing the electrochemical sensor 90 in the calibration holder 60.

As a result, the user can easily cause the electrochemical sensor 90 to perform the calibration operation by installing the electrochemical sensor 90 in the calibration holder 60, and it can be suppressed that the electrochemical sensor 90 performs the measurement operation by erroneously pressing the measurement switch 13*b* by the user.

In addition, since the magnetic switch 13*d* and the magnet 66 can be switches that are not in contact with one another, the magnetic switch 13*d* need not be exposed from the surface of the electrochemical sensor 90, and the magnet 66 also need not be exposed from the surface of the calibration holder 60. Therefore, the electrochemical sensor 90 and the calibration holder 60 can be easily designed to be waterproof.

Although the calibration operation of the third embodiment has been described, the measurement operation of the third embodiment is performed in the same manner as that of the first embodiment, for example.

Fourth Embodiment

In the fourth embodiment, a part different from the first embodiment to the third embodiment will be described. In the fourth embodiment, an example of a calibration switch, which is different from the calibration switch 13*a* and the magnetic switch 13*d*, for causing the control unit 11 to perform the calibration operation will be described.

Electrochemical Sensor 90 of Fourth Embodiment

Figure 11:
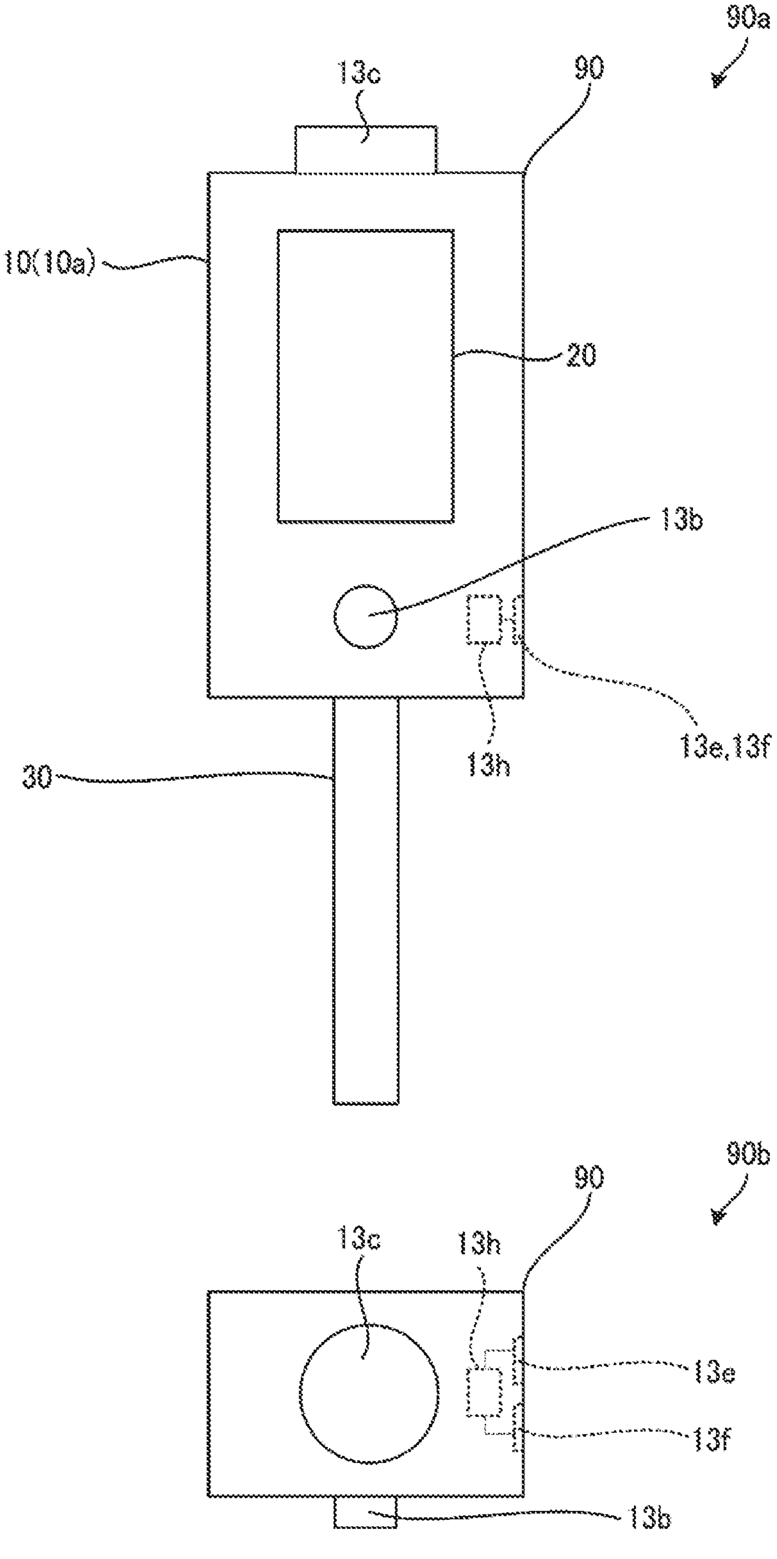
FIG. 11 is a diagram illustrating an example of the electrochemical sensor 90 according to a fourth embodiment.

FIG. 11 is a diagram illustrating an example of the electrochemical sensor 90 according to the fourth embodiment. The electrochemical sensor 90 illustrated in FIG. 11 includes electrodes 13*e* and 13*f* and a detection circuit 13*h* instead of the calibration switch 13*a* of the electrochemical sensor 90 illustrated in FIG. 2. The electrodes 13*e* and 13*f* are respective electrodes exposed on the side surface of the case 10*a* in a state of being separated from one another.

When the electrodes 13*e* and 13*f* short-circuit, a detection signal is output by the detection circuit 13*h*. When the detection signal is output from the detection circuit 13*h*, the control unit 11 performs the calibration operation. The electrodes 13*e* and 13*f* and the detection circuit 13*h* are examples of a calibration switch for causing the control unit 11 to perform the calibration operation.

Calibration Holder 60 of Fourth Embodiment

Figure 12:
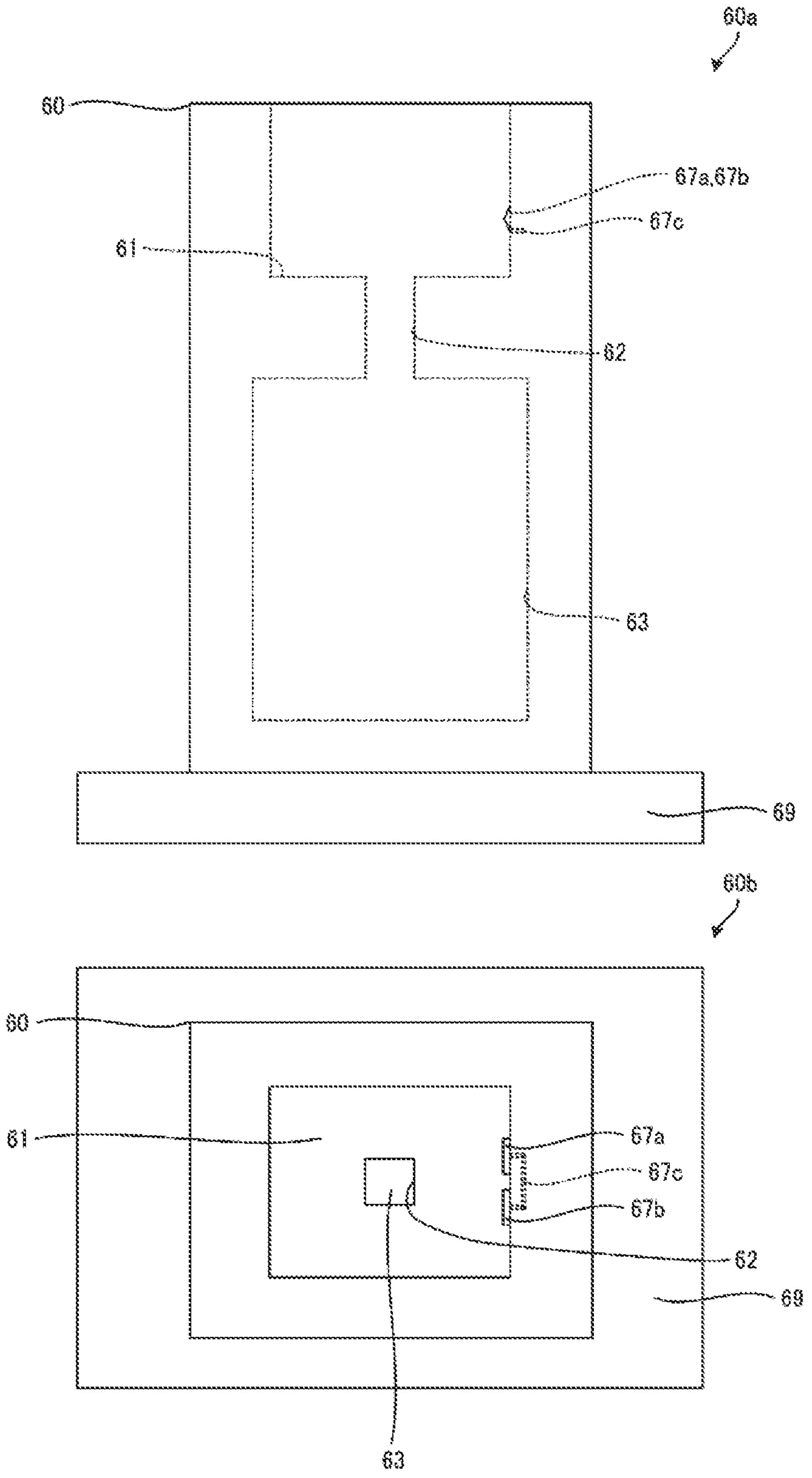
FIG. 12 is a diagram illustrating an example of the calibration holder 60 according to the fourth embodiment.

FIG. 12 is a diagram illustrating an example of the calibration holder 60 according to the fourth embodiment. The calibration holder 60 illustrated in FIG. 12 includes electrodes 67*a* and 67*b* and a short-circuit path 67*c* instead of the switch 64 of the calibration holder 60 illustrated in FIG. 3. The electrodes 67*a* and 67*b* are respective electrodes exposed on the inner side of the sidewall portion of the holding portion 61 in a state of being separated from one another. To be specific, the electrodes 67*a* and 67*b* are provided at positions in contact with the electrodes 13*e* and 13*f* of the electrochemical sensor 90, respectively, when the electrochemical sensor 90 is held by the holding portion 61.

The short-circuit path 67*c* is embedded in the sidewall portion of the holding portion 61 and connects the electrodes 67*a* and 67*b* to one another. The electrodes 67*a* and 67*b* and the short-circuit path 67*c* are examples of the operation unit that operates the calibration switch (the electrodes 13*e* and 13*f* and the detection circuit 13*h* of the electrochemical sensor 90) by the calibration holder 60 holding the electrochemical sensor 90.

Figure 13:
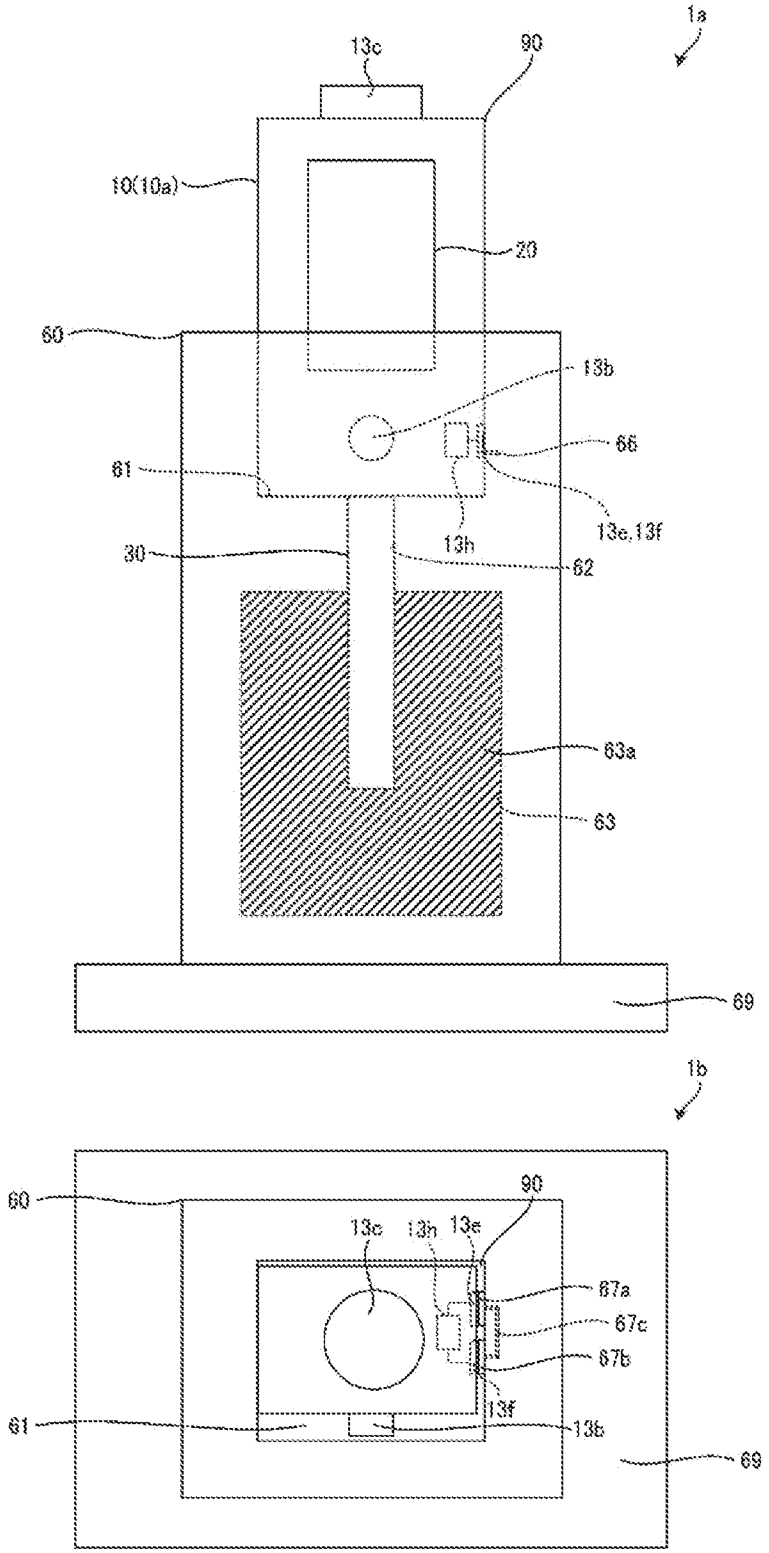
FIG. 13 is a diagram illustrating an example of a state of the electrochemical sensor 90 and the calibration holder 60 during a calibration operation according to the fourth embodiment.

State of Electrochemical Sensor 90 and Calibration Holder 60 During Calibration Operation of Fourth Embodiment FIG. 13 is a diagram illustrating an example of the state of the electrochemical sensor 90 and the calibration holder 60 during the calibration operation according to the fourth embodiment. When the calibration solution 63*a* is put into the housing portion 63 of the calibration holder 60 illustrated in FIG. 12 and the electrochemical sensor 90 illustrated in FIG. 11 is installed in the calibration holder 60, for example, the state becomes as illustrated in FIG. 13.

To be more specific, when the electrochemical sensor 90 is installed in the calibration holder 60, the electrodes 13*e* and 13*f* of the calibration holder 60 come into contact with the electrodes 67*a* and 67*b* of the electrochemical sensor 90, respectively. As a result, the detection signal is output, and the calibration operation is performed by the control unit 11. Therefore, the user can easily perform the calibration operation by installing the electrochemical sensor 90 in the calibration holder 60.

As a result, the user can easily cause the electrochemical sensor 90 to perform the calibration operation by installing the electrochemical sensor 90 in the calibration holder 60, and it can be suppressed that the electrochemical sensor 90 performs the measurement operation by erroneously pressing the measurement switch 13*b* by the user.

Although the calibration operation of the fourth embodiment has been described, the measurement operation of the fourth embodiment is performed in the same manner as that of the first embodiment, for example.

Fifth Embodiment

In the fifth embodiment, a part different from the first embodiment to the fourth embodiment will be described. In the fifth embodiment, a configuration using a measurement holder that holds the electrochemical sensor 90 in a state where the sensor head 30 is brought into contact with the liquid to be measured 70*a* will be described.

External Configuration of Electrochemical Sensor 90 of Fifth Embodiment

Figure 14:
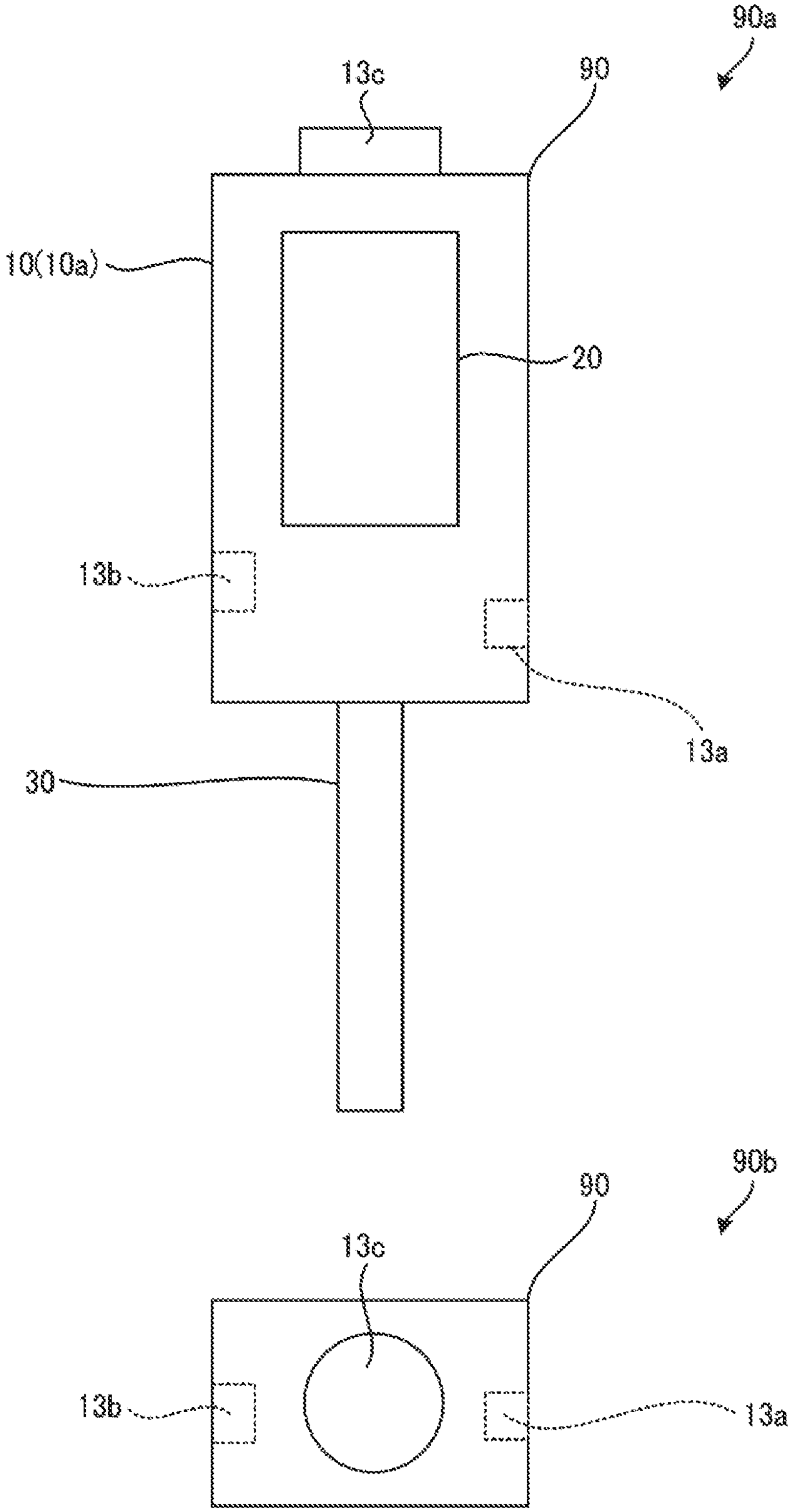
FIG. 14 is a diagram illustrating an example of an external configuration of the electrochemical sensor 90 according to a fifth embodiment.

FIG. 14 is a diagram illustrating an example of the external configuration of the electrochemical sensor 90 according to the fifth embodiment. In the example of FIG. 14, the measurement switch 13*b* is provided on a side surface of the case 10*a*. Similarly to the calibration switch 13*a*, the measurement switch 13*b* is a press-switch that does not protrude from the case 10*a* and is sufficiently small with respect to a finger of the user or the like, and therefore it is difficult for the user to press the measurement switch 13*b* with a finger or the like.

Figure 15:
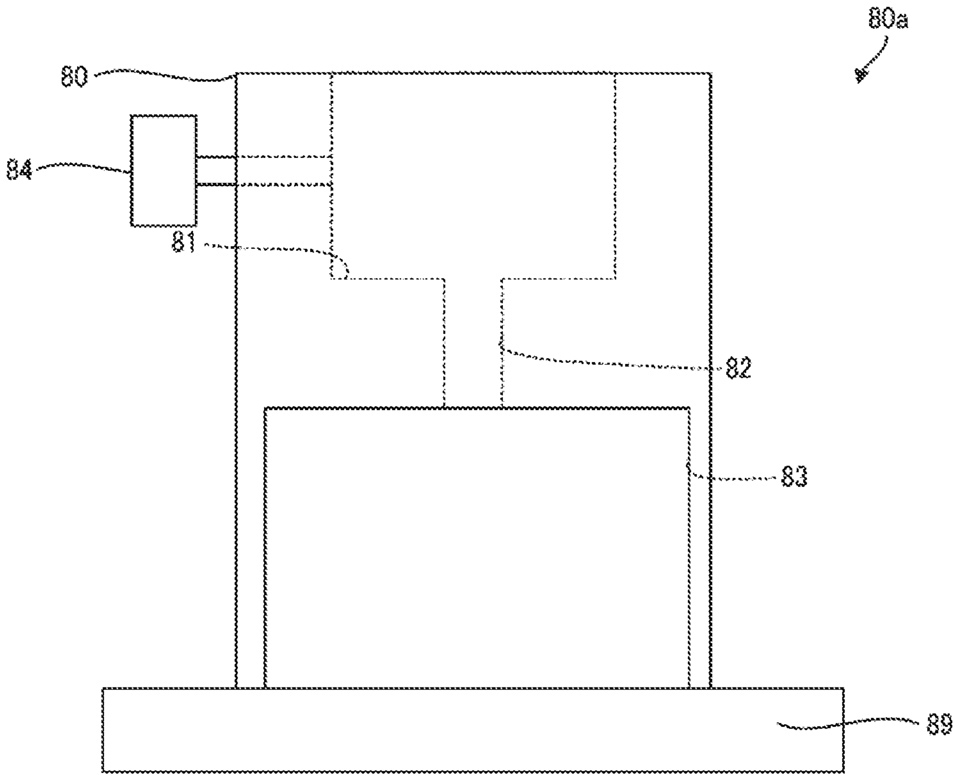
FIG. 15 is a diagram illustrating an example of a measurement holder 80 that holds the electrochemical sensor 90 according to the fifth embodiment.
Figure 15:
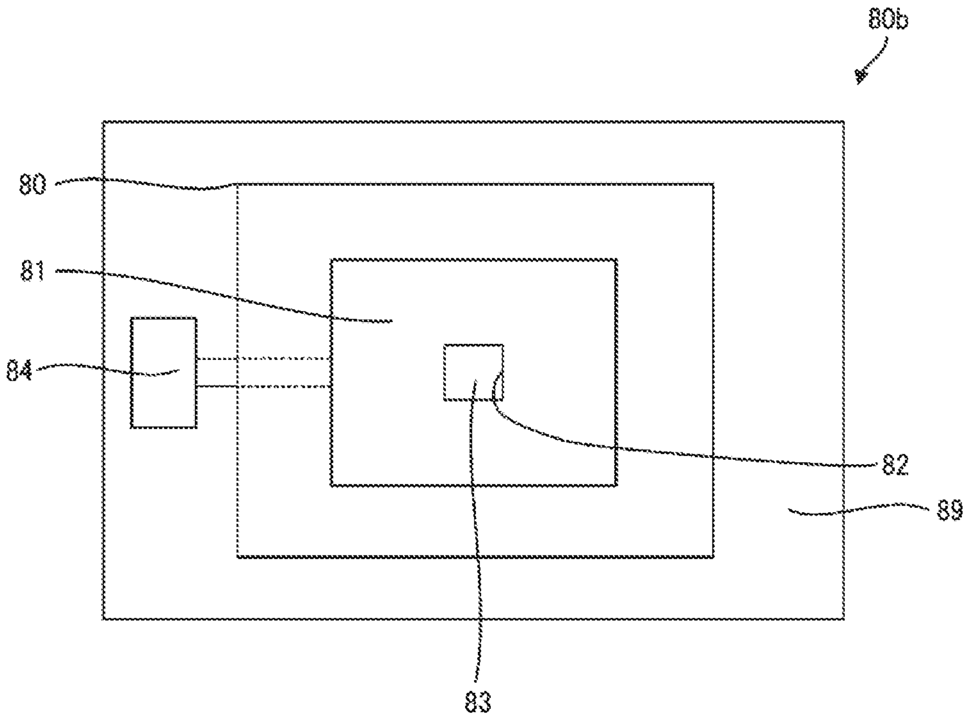

Measurement Holder 80 Holding Electrochemical Sensor 90 of Fifth Embodiment FIG. 15 is a diagram illustrating an example of the measurement holder 80 that holds the electrochemical sensor 90 according to the fifth embodiment. A front surface 80*a* is a front surface of the measurement holder 80. An upper surface 80*b* is an upper surface of the measurement holder 80. The measurement holder 80 illustrated in FIG. 15 is a stand-type measurement holder that holds the electrochemical sensor 90 with the sensor head 30 brought into contact with the liquid to be measured 70*a*. The measurement holder 80 includes a holding portion 81, a sensor head insertion hole 82, a container installation portion 83, a switch 84, and a base 89.

Similarly to the holding portion 61 of the calibration holder 60, the holding portion 81 is a hole having a shape allows holding the distal end distal end portion of the case 10*a* of the electrochemical sensor 90. Similarly to the sensor head insertion hole 62 of the calibration holder 60, the sensor head insertion hole 82 is a hole that is electrically connected to the container installation portion 83 from the bottom portion of the holding portion 81 and has a shape into which the sensor head 30 of the electrochemical sensor 90 can be inserted. The container installation portion 83 is a space in which the container 70 containing the liquid to be measured 70*a* can be installed.

The switch 84 is a press switch for operating the measurement switch 13*b* of the held electrochemical sensor 90 from the outside of the measurement holder 80. The configuration of the switch 84 is similar to the configuration of the switch 64 of the calibration holder 60. Similarly to the base 69 of the calibration holder 60, the base 89 is provided at the bottom portion of the measurement holder 80 and is a member having a flat bottom surface.

Figure 16:
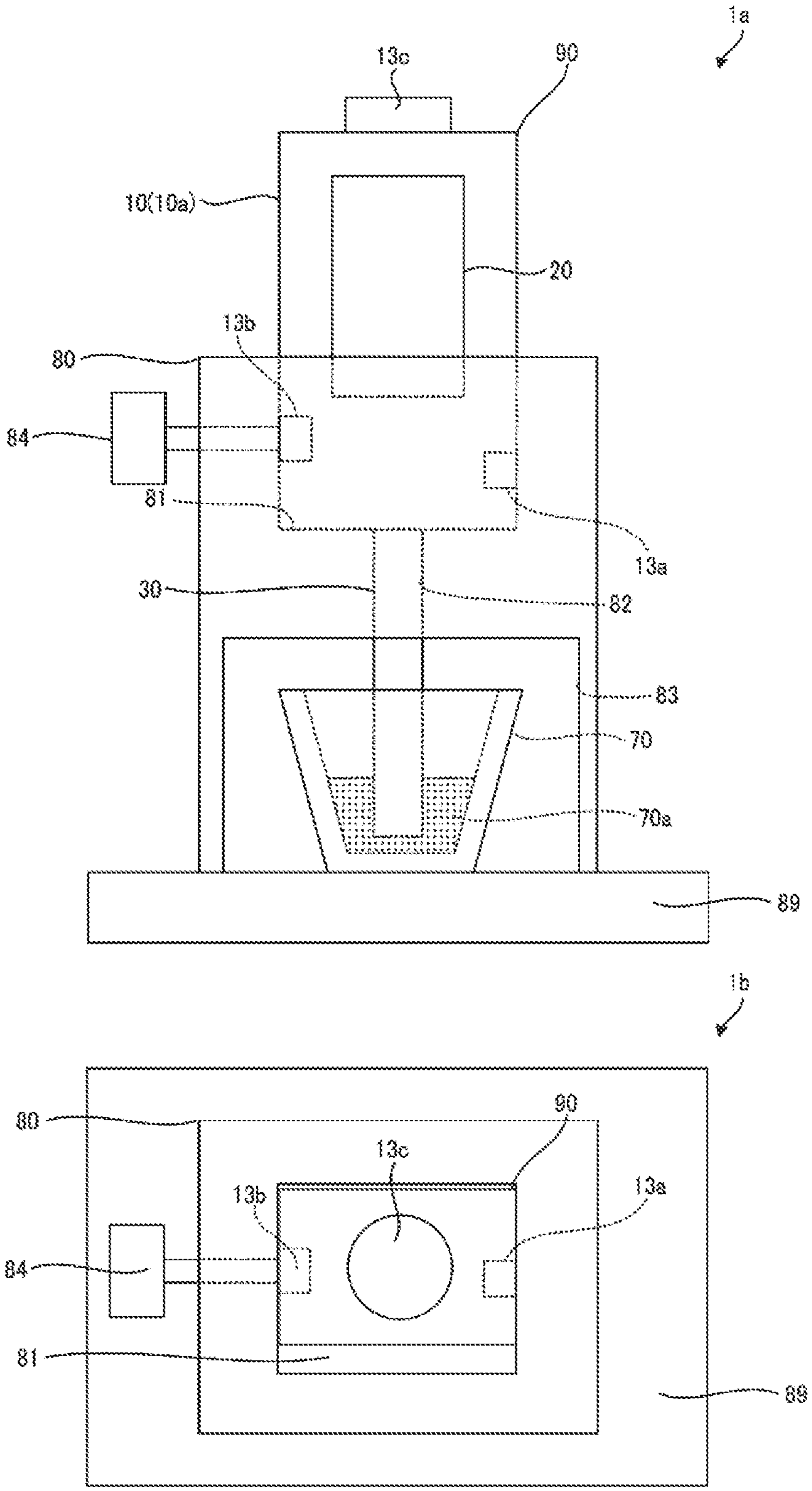
FIG. 16 is a diagram illustrating an example of a state of the electrochemical sensor 90 and the measurement holder 80 during a measurement operation according to the fifth embodiment.

State of Electrochemical Sensor 90 and Measurement Holder 80 During Measurement Operation of Fifth Embodiment FIG. 16 is a diagram illustrating an example of the state of the electrochemical sensor 90 and the measurement holder 80 during the measurement operation according to the fifth embodiment. When the container 70 containing the liquid to be measured 70*a* is installed in the container installation portion 83 of the measurement holder 80 and the electrochemical sensor 90 is installed in the measurement holder 80, for example, the state becomes as illustrated in FIG. 16.

In the state of FIG. 16, the distal end distal end portion of the case 10*a* is held by the holding portion 81 in a state where the distal end distal end portion of the sensor head 30 is in contact with the liquid to be measured 70*a* of the container 70 through the sensor head insertion hole 82.

Accordingly, for example, even when the user releases the hand from the electrochemical sensor 90, the electrochemical sensor 90 is held in a state where the sensor head 30 is brought into contact with the liquid to be measured 70*a*.

In the state of FIG. 16, the calibration switch 13*a* of the electrochemical sensor 90 is shielded from the outside by the sidewall portion of the holding portion 81. That is, the sidewall portion of the holding portion 81 is an example of a shielding portion that shields the calibration switch 13*a* of the electrochemical sensor 90 held by the measurement holder 80. The measurement holder 80 is not provided with a press-switch for operating the calibration switch 13*a* from the outside of the measurement holder 80, such as the switch 64 of the calibration holder 60. Therefore, it is difficult for the user to press the measurement switch 13*b* with a finger or the like.

On the other hand, in the state of FIG. 16, when the switch 84 is pressed, the measurement switch 13*b* is pressed by a distal end of a pin provided in the switch 84. Therefore, the user can easily press the measurement switch 13*b* by pressing the switch 84 with a finger or the like.

That is, in the state of FIG. 16 (when the electrochemical sensor 90 and the measurement holder 80 are coupled), the measurement switch 13*b* is operable and the calibration switch 13*a* is inoperable. Thus, the user can press the switch 84 to cause the electrochemical sensor 90 to easily perform the measurement operation, and it can be suppressed that the user erroneously presses the calibration switch 13*a* and the electrochemical sensor 90 performs the calibration operation.

Although the measurement operation of the fifth embodiment has been described, the measurement operation of the fifth embodiment is performed in the same manner as that of the first embodiment, for example. The configuration of the fifth embodiment may be combined with the configuration of any of the second embodiment to the fourth embodiment.

Sixth Embodiment

In the sixth embodiment, a part different from the first embodiment to the fifth embodiment will be described. The calibration holder 60 has been described as an example of the calibration member above, the calibration member is not limited to the calibration holder 60. In the sixth embodiment, another example of the calibration member will be described.

State During Calibration Operation of Sixth Embodiment

Figure 17:
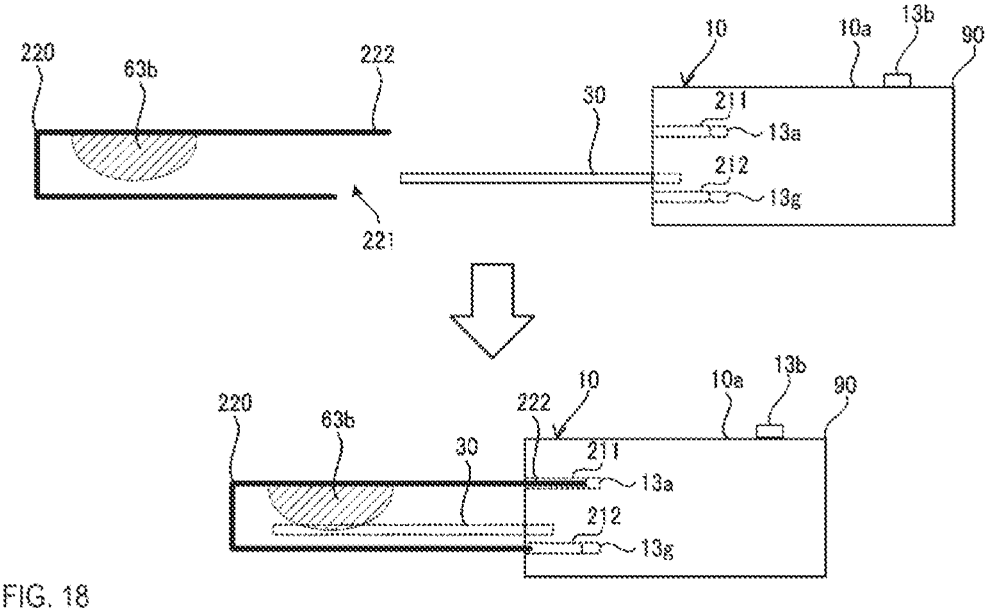
FIG. 17 is a diagram illustrating an example of a state during a calibration operation according to a sixth embodiment.

FIG. 17 is a diagram illustrating an example of the state during the calibration operation according to the sixth embodiment. A calibration agent case 220 is an example of a calibration member different from the calibration holder 60. FIG. 17 illustrates a cross-section of the calibration agent case 220. In the example of FIG. 17, holes 211 and 212 are provided in the case 10*a* of the electrochemical sensor 90. The calibration switch 13*a* is provided at the bottom portion of the hole 211. This makes it difficult for the user to press the calibration switch 13*a* with a finger or the like with the electrochemical sensor 90 alone.

The measurement switch 13*b* is provided so as to protrude from the body 10. A measurement restriction release switch 13*g* is provided at the bottom portion of the hole 212. When the measurement restriction release switch 13*g* is pressed and the measurement switch 13*b* is pressed, the control unit 11 performs the measurement operation. Thus, the electrochemical sensor 90 alone does not perform the measurement operation even when the user presses the measurement switch 13*b* with a finger or the like. That is, when the electrochemical sensor 90 and the calibration agent case 220 are coupled, the measurement operation is restricted.

The calibration agent case 220 is a case for storing a calibration gel 63*b*. The calibration gel 63*b* is an example of a calibration agent having the known concentration ratio of the sodium ions and the potassium ions different from the calibration solution 63*a*. In the example of FIG. 17, the calibration agent case 220 has a substantially hollow quadrangular prism shape, and the calibration gel 63*b* is applied to an inner upper surface thereof.

The calibration agent case 220 has an opening portion 221 into which the sensor head 30 is inserted. By inserting the sensor head 30 into the opening portion 221 and coupling the calibration agent case 220 to the case 10*a*, the sodium ion selective electrode 41 and the potassium ion selective electrode 42 of the sensor head 30 come into contact with the calibration gel 63*b* in the calibration agent case 220.

In addition, the calibration agent case 220 has a pin 222 protruding from an upper portion of the opening portion 221. The pin 222 is formed so as to be fitted into the hole 211 to press the calibration switch 13*a* in a state where the calibration agent case 220 is coupled to the case 10*a*. Thus, when the user inserts the sensor head 30 into the opening portion 221 and couples the calibration agent case 220 to the case 10*a*, the sodium ion selective electrode 41 and the potassium ion selective electrode 42 are in contact with the calibration gel 63*b*, and the electrochemical sensor 90 performs the calibration operation.

State During Measurement Operation of Sixth Embodiment

Figure 18:
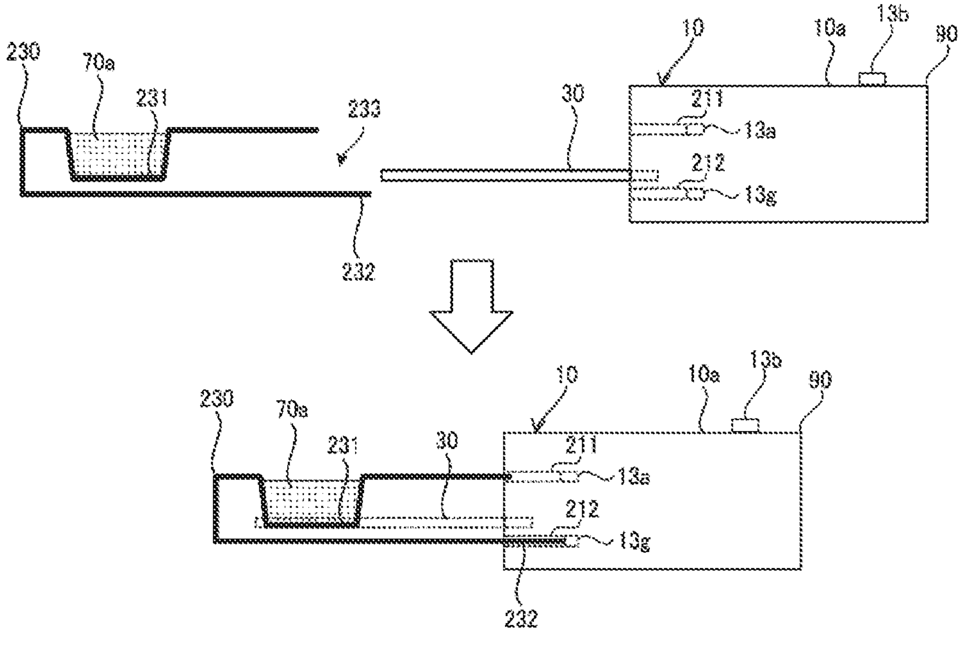
FIG. 18 is a diagram illustrating an example of a state during a measurement operation according to the sixth embodiment.

FIG. 18 is a diagram illustrating an example of the state during the measurement operation according to the sixth embodiment. A measurement spoon 230 is a member having a substantially hollow quadrangular prism shape and having a dish portion 231 that allows holding the liquid to be measured 70*a*. FIG. 18 illustrates a cross-section of the measurement spoon 230. The measurement spoon 230 has an opening portion 233 for inserting the sensor head 30.

By inserting the sensor head 30 into the opening portion 233 and coupling the measurement spoon 230 to the case 10*a*, the sodium ion selective electrode 41 and the potassium ion selective electrode 42 of the sensor head 30 are exposed from the bottom portion of the dish portion 231 of the measurement spoon 230, and the sodium ion selective electrode 41 and the potassium ion selective electrode 42 come into contact with the liquid to be measured 70*a*.

The measurement spoon 230 has a pin 232 protruding from a lower portion of the opening portion 233. The pin 232 is formed so as to be fitted into the hole 212 in a state where the measurement spoon 230 is coupled to the case 10*a* to press the measurement restriction release switch 13*g*.

Thus, when the user inserts the sensor head 30 into the opening portion 233 and couples the measurement spoon 230 to the case 10*a*, the sodium ion selective electrode 41 and the potassium ion selective electrode 42 come into contact with the liquid to be measured 70*a*, and the measurement restriction release switch 13*g* is pressed. When the user presses the measurement switch 13*b* in this state, the measurement operation is performed by the electrochemical sensor 90.

On the other hand, in the state of FIG. 18, it is difficult to press the calibration switch 13*a*. That is, when the electrochemical sensor 90 and the calibration agent case 220 are not coupled, the calibration operation is restricted.

As illustrated in FIG. 17 and FIG. 18, also in the sixth embodiment, the measurement operation is restricted when the electrochemical sensor 90 and the calibration agent case 220 are coupled, and the calibration operation is restricted when the electrochemical sensor 90 and the calibration agent case 220 are not coupled. For this reason, it is possible to suppress an operation unintended by the user due to an erroneous operation by the user, such as the measurement operation being performed in a state where the sensor head 30 is brought into contact with the calibration gel 63*b* or the calibration operation being performed in a state where the sensor head 30 is not in contact with the calibration gel 63*b*.

Figure 19:
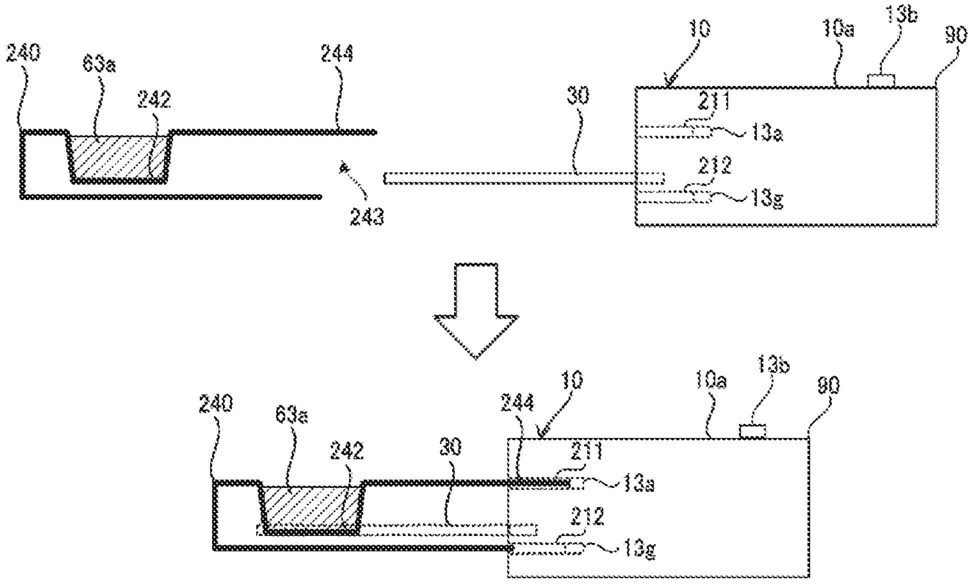
FIG. 19 is a diagram illustrating a calibration spoon 240 as another example of a calibration member according to the sixth embodiment.

Calibration Spoon 240 as Another Example of Calibration Member of Sixth Embodiment FIG. 19 is a diagram illustrating the calibration spoon 240 as another example of the calibration member according to the sixth embodiment. In the sixth embodiment, the calibration spoon 240 may be used instead of the calibration agent case 220. FIG. 19 illustrates a cross-section of the calibration spoon 240.

Similarly to the measurement spoon 230, the calibration spoon 240 is a member having a substantially hollow quadrangular prism shape and having a dish portion 242 that allows holding the calibration solution 63*a*. The calibration spoon 240 has an opening portion 243 for inserting the sensor head 30.

By inserting the sensor head 30 into the opening portion 243 and coupling the calibration spoon 240 to the case 10*a*, the sodium ion selective electrode 41 and the potassium ion selective electrode 42 of the sensor head 30 are exposed from the bottom portion of the dish portion 242 of the calibration spoon 240, and the sodium ion selective electrode 41 and the potassium ion selective electrode 42 come into contact with the calibration solution 63*a*. In addition, the calibration spoon 240 has a pin 244 projecting from an upper portion of the opening portion 243. The pin 244 is formed so as to be fitted into the hole 211 to press the calibration switch 13*a* in a state where the calibration spoon 240 is coupled to the case 10*a*.

Thus, when the user inserts the sensor head 30 into the opening portion 243 and couples the calibration spoon 240 to the case 10*a*, the sodium ion selective electrode 41 and the potassium ion selective electrode 42 are in contact with the calibration solution 63*a*, and the electrochemical sensor 90 performs the calibration operation.

Figure 20:
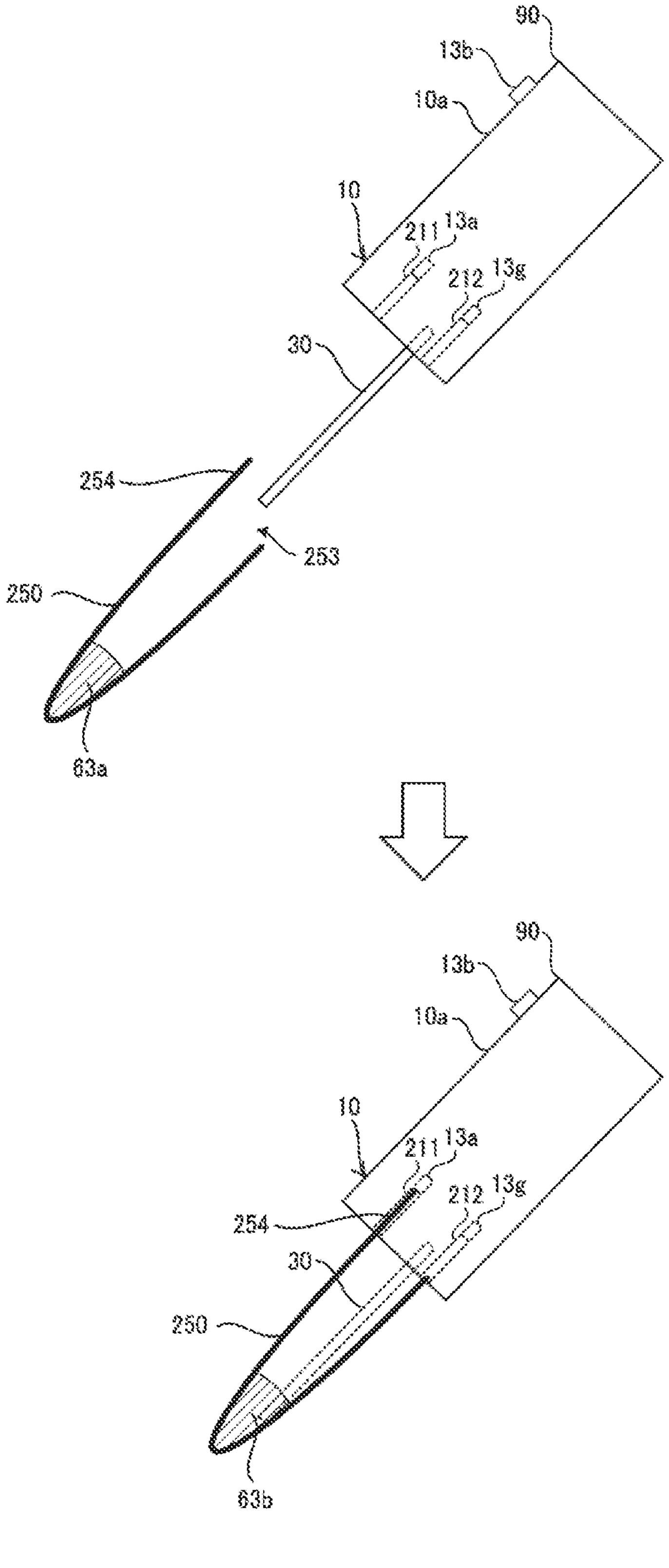
FIG. 20 is a diagram illustrating a calibration cap 250 as still another example of the calibration member according to the sixth embodiment.

Calibration Cap 250 as Still Another Example of Calibration Member of Sixth Embodiment FIG. 20 is a diagram illustrating the calibration cap 250 as still another example of the calibration member according to the sixth embodiment. In the sixth embodiment, the calibration cap 250 may be used instead of the calibration agent case 220. FIG. 20 illustrates a cross-section of the calibration cap 250.

The calibration cap 250 is a hollow cap that can be attached to the electrochemical sensor 90 so as to cover the sensor head 30. The calibration gel 63*b* is applied to the inside of the calibration cap 250. The calibration cap 250 has an opening portion 253 into which the sensor head 30 is inserted.

By inserting the sensor head 30 into the opening portion 253 and coupling the calibration cap 250 to the case 10*a*, the sodium ion selective electrode 41 and the potassium ion selective electrode 42 of the sensor head 30 come into contact with the calibration gel 63*b* inside the calibration cap 250. In addition, the calibration cap 250 has a pin 254 protruding from an upper portion of the opening portion 253. The pin 254 is formed so as to be fitted into the hole 211 to press the calibration switch 13*a* in a state where the calibration cap 250 is coupled to the case 10*a*.

Thus, when the user inserts the sensor head 30 into the opening portion 253 and couples the calibration cap 250 to the case 10*a*, the sodium ion selective electrode 41 and the potassium ion selective electrode 42 are in contact with the calibration gel 63*b*, and the electrochemical sensor 90 performs the calibration operation.

Seventh Embodiment

In the seventh embodiment, a part different from the first embodiment to the sixth embodiment will be described. In the seventh embodiment, a configuration in which the sensor head 30 is attached to the case 10*a* via a connector will be described.

Configuration of Electrochemical Sensor 90 of Seventh Embodiment

Figure 21:
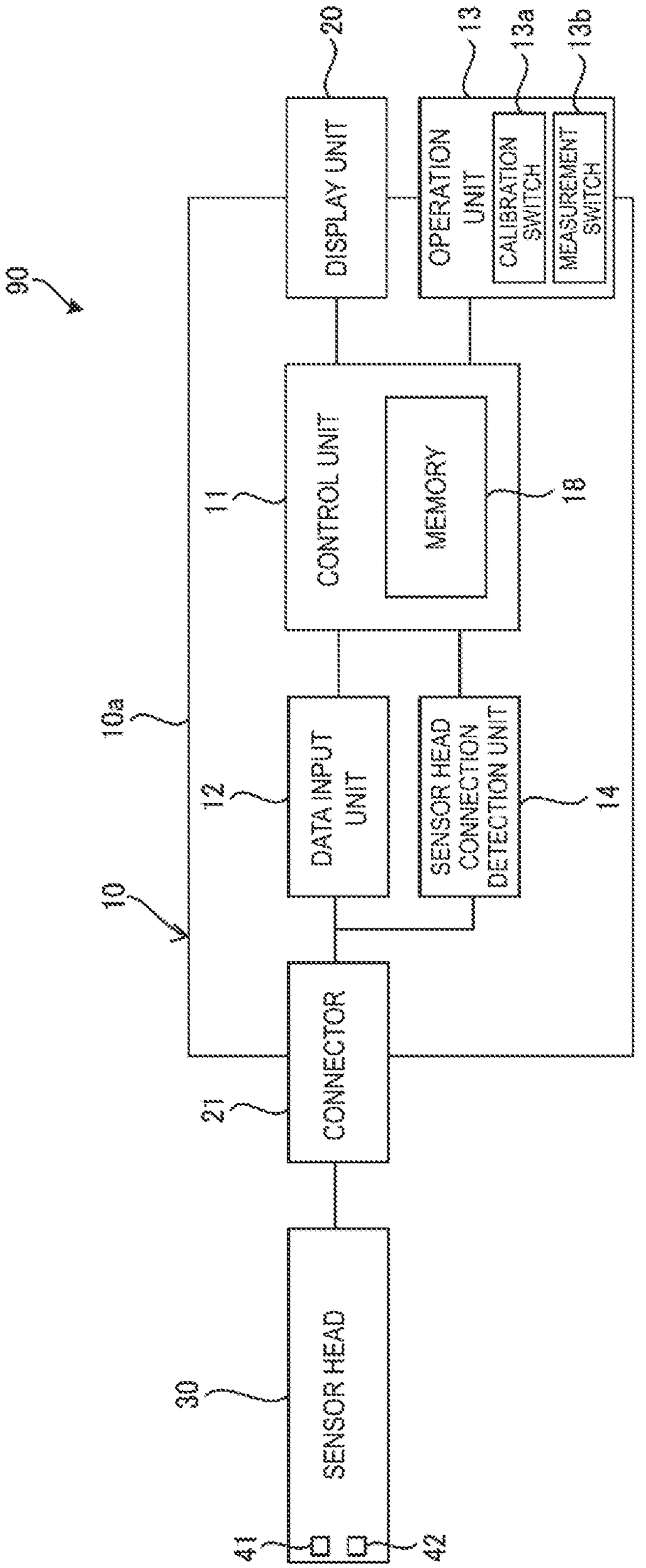
FIG. 21 is a diagram illustrating an example of a configuration of the electrochemical sensor 90 according to a seventh embodiment.

FIG. 21 is a diagram illustrating an example of the configuration of the electrochemical sensor 90 according to the seventh embodiment. The electrochemical sensor 90 illustrated in FIG. 21 includes a connector 21 in addition to the configuration of the electrochemical sensor 90 illustrated in FIG. 1. The connector 21 is provided so as to pass through a wall surface of the case 10*a*. The sensor head 30 is attachable to and detachable from the connector 21.

The electrochemical sensor 90 may further include a sensor head connection detection unit 14. The sensor head connection detection unit 14 detects whether or not the sensor head 30 is attached to the connector 21 based on, for example, sensing data of a switch provided in the connector 21. The control unit 11 may perform the measurement operation and the calibration operation only in a state where the sensor head 30 is attached to the connector 21 based on the detection result by the sensor head connection detection unit 14.

Configuration Example of Sensor Head 30A

Figure 22:
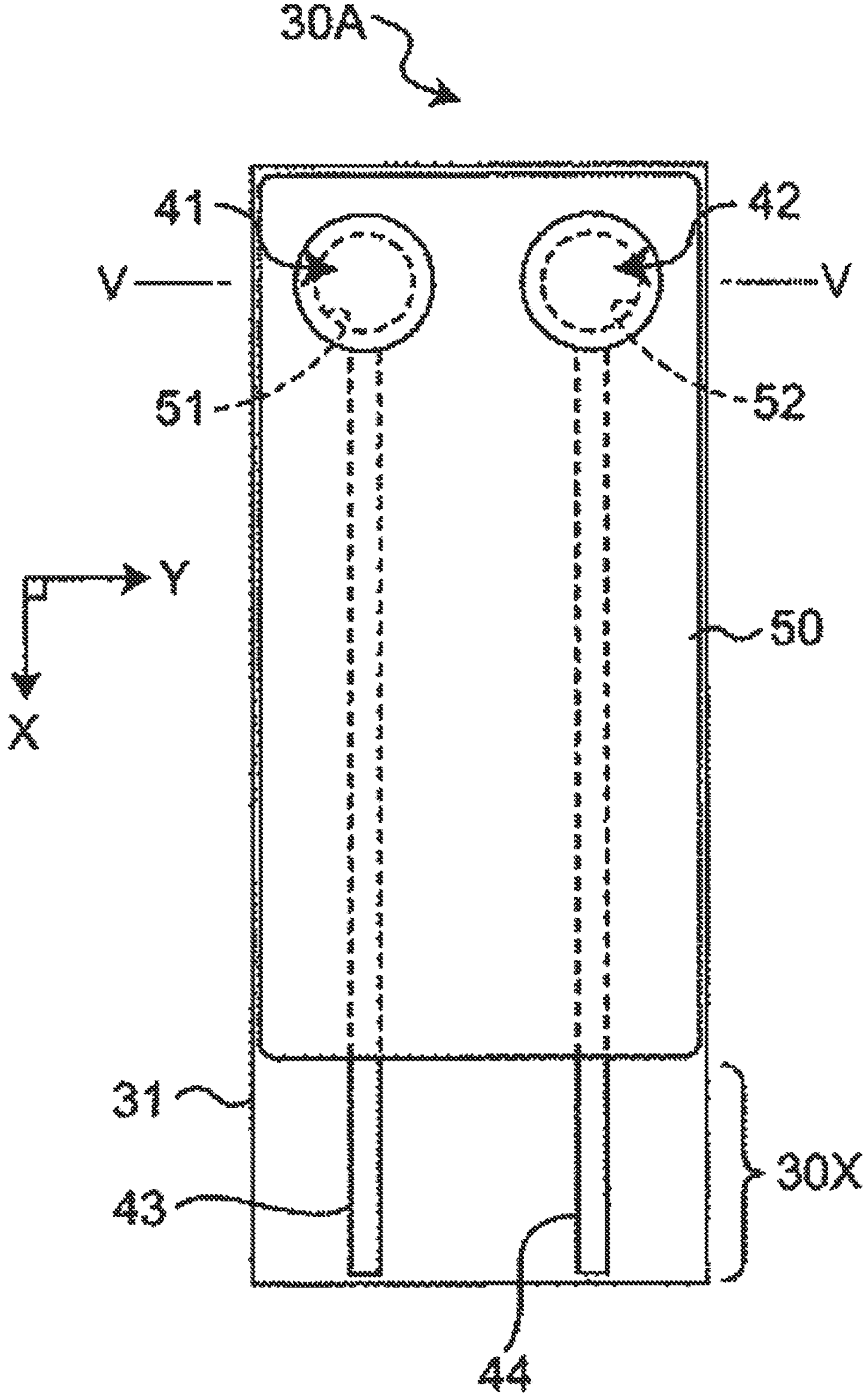
FIG. 22 is a diagram illustrating a sensor head 30A as an example of a sensor head 30.
Figure 23:
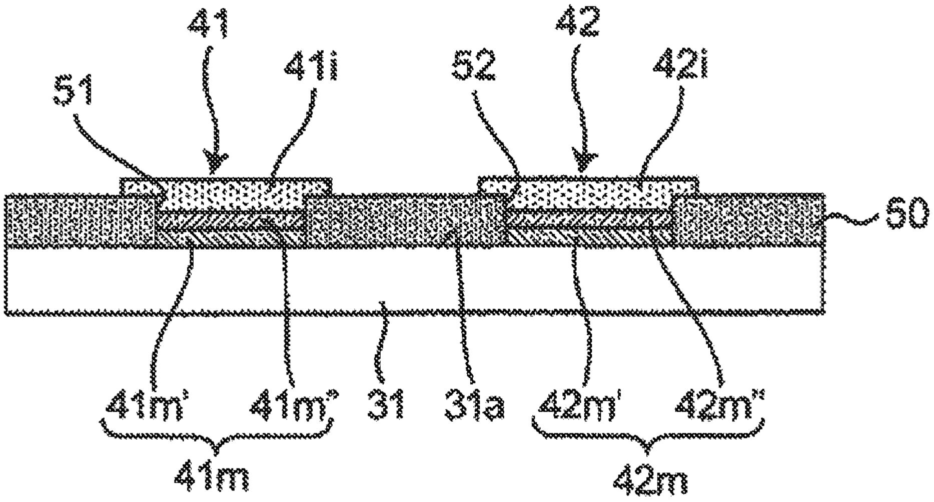
FIG. 23 is a cross-sectional view taken along line V-V in FIG. 22.
Figure 24:
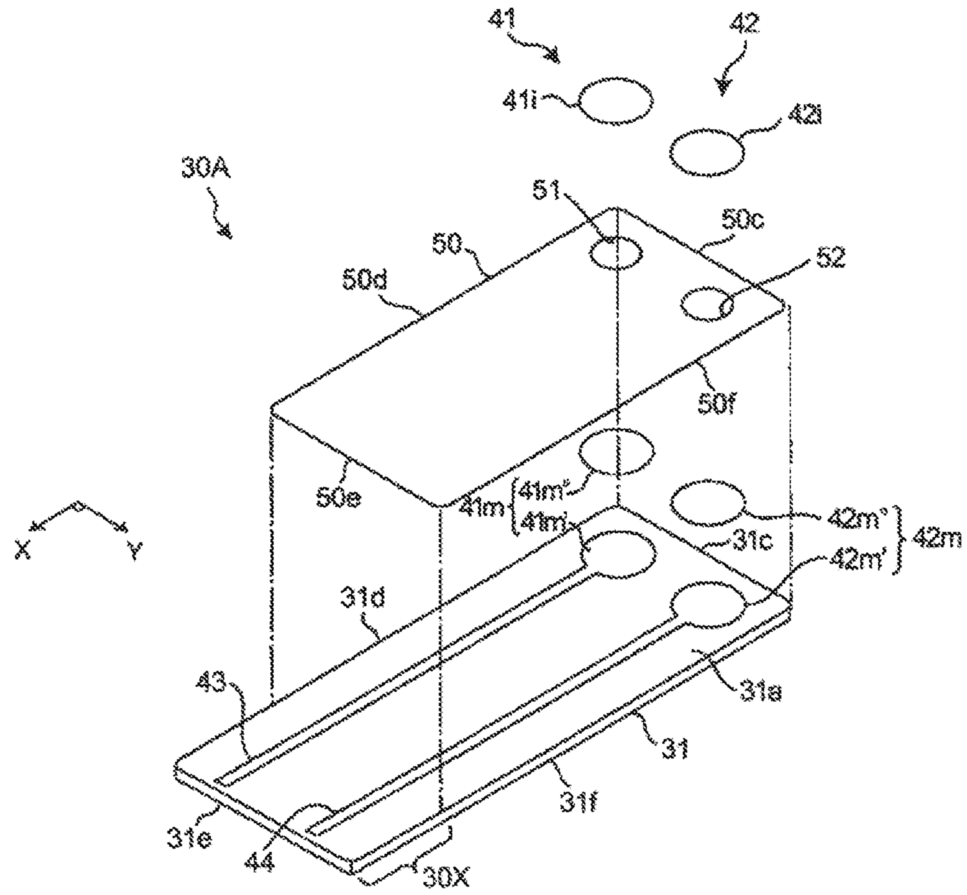
FIG. 24 is a diagram illustrating the sensor head 30A in an exploded state.

FIG. 22 is a diagram illustrating a sensor head 30A as an example of the sensor head 30. FIG. 22 illustrates the sensor head 30A in a completed state as viewed from a direction perpendicular to a plate surface. FIG. 23 is a cross-sectional view taken along line V-V in FIG. 22. FIG. 24 is a diagram illustrating the sensor head 30A in an exploded state.

As seen from FIG. 22 to FIG. 24, the sensor head 30A includes a rectangular substrate 31 having a predetermined size, the sodium ion selective electrode 41 and the potassium ion selective electrode 42 disposed on a mounting surface 31*a*, which is one main surface of the substrate 31, so as to be spaced apart from one another along one side 31*c*, and a first extraction electrode 43 and a second extraction electrode 44 extending parallel to one another in an X direction from the sodium ion selective electrode 41 and the potassium ion selective electrode 42, respectively, toward a side (edge portion) 31*e* at the opposite side of the substrate 31.

The substrate 31 is made of an insulating material, such as polyethylene terephthalate (PET), glass, silicon, a polyimide film, glass epoxy, polycarbonate, or acrylic. Therefore, the mounting surface 31*a* also has insulating properties.

The first extraction electrode 43 and the second extraction electrode 44 are made of a conductive material, such as Pt, Ag, Au, Ir, C, or $IrO_2$.

As seen from FIG. 23 and FIG. 24, the sodium ion selective electrode 41 has, as a first internal electrode 41*m*, a first core material lower layer 41*m*' made of the same material as that of the first extraction electrode 43 and having conductivity, and a first core material upper layer 41*m*" made of AgCl provided in direct contact with the first core material lower layer 41*m*'. Besides, the sodium ion selective electrode 41 has the sodium ion selective membrane 41*i* provided in direct contact with the first internal electrode 41*m* (more exactly, the first core material upper layer 41*m*").

Similarly, the potassium ion selective electrode 42 has, as a second internal electrode 42*m*, a second core material lower layer 42*m*' made of the same material as that of the second extraction electrode 44 and having conductivity, and a second core material upper layer 42*m*" made of AgCl provided in direct contact with the second core material lower layer 42*m*'. At the same time, the potassium ion selective electrode 42 has the potassium ion selective membrane 42*i* provided in direct contact with the second internal electrode 42*m* (more exactly, the second core material upper layer 42*m*").

The region where the first internal electrode 41*m* and the sodium ion selective membrane 41*i* are in contact and the region where the second internal electrode 42*m* and the potassium ion selective membrane 42*i* are in contact are defined by sizes of openings 51 and 52 (about 4 mm in diameter in this example), respectively, provided in an insulating substrate (formed of a photo-curable or heat-curable resist, or an insulating seal, sheet, tape, or the like) 50.

The sodium ion selective membrane 41*i* has a property of selectively permeating sodium ions ($Na^+$) contained in the calibration solution or the liquid to be measured described later. The potassium ion selective membrane 42*i* has a property of selectively permeating potassium ions ($K^+$) each contained in the calibration solution or the liquid to be measured described later.

As seen from FIG. 22, the first extraction electrode 43 and the second extraction electrode 44 are exposed in an electrode pad portion 30*x*, which is a portion of the sensor head 30A not covered with the insulating substrate 50.

The sensor head 30A as described above has the relatively small number of components, in particular, is formed in a substantially rectangular flat plate shape, and an internal liquid contained in a general ion selective electrode is omitted. The electrodes to be in contact with the liquid to be measured are only the sodium ion selective electrode 41 and the potassium ion selective electrode 42. The sensor head 30A can therefore be configured in a compact and inexpensive manner.

Figure 25:
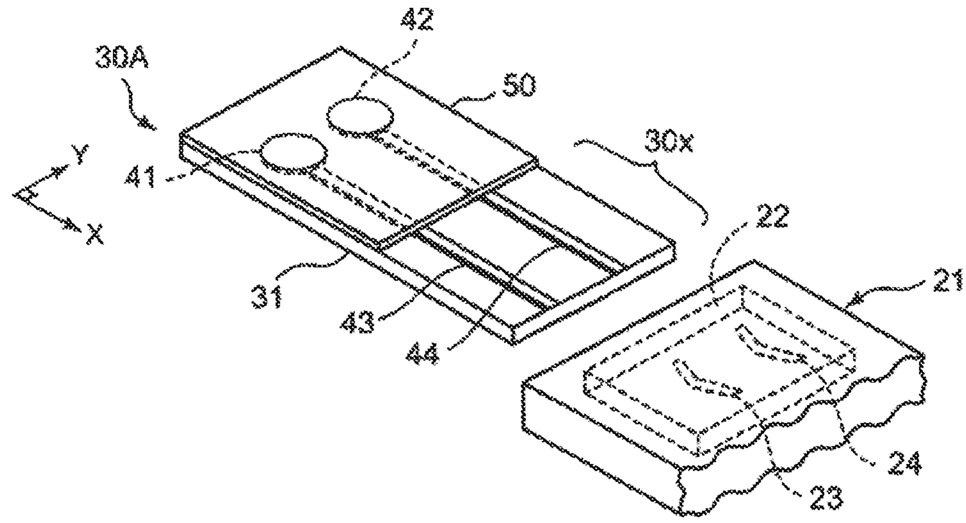
FIG. 25 is a perspective view illustrating the sensor head 30 illustrated in FIG. 22 together with a connector 21.

FIG. 25 is a perspective view illustrating the sensor head 30 illustrated in FIG. 22 together with the connector 21. As illustrated in FIG. 25, the connector 21 illustrated in FIG. 21 has a slot 22 into which the electrode pad portion 30*x* of the sensor head 30A is to be inserted. In the slot 22, at positions corresponding to the first extraction electrode 43 and the second extraction electrode 44 of the sensor head 30A, contact members 23 and 24 formed of dogleg-shaped leaf springs are provided. When the user inserts the electrode pad portion 30*x* of the sensor head 30A into the slot 22, the first extraction electrode 43 and the second extraction electrode 44 are in contact with the contact members 23 and 24 and are electrically connected. As a result, the potential difference or the current between the sodium ion selective electrode 41 and the potassium ion selective electrode 42 of the sensor head 30A can be detected by the body 10 via the connector 21.

Note that the shape of the sensor head 30 is not limited to the shape of the sensor head 30A illustrated in FIG. 22 to FIG. 25, and various shapes can be employed. For example, the sodium ion selective electrode 41 and the potassium ion selective electrode 42 may be disposed along a longitudinal direction of the sensor head 30A.

The configuration of the sensor head 30A illustrated in FIG. 22 to FIG. 25 can also be applied to a configuration in which the sensor head 30 is directly connected to the body 10 without providing the connector 21 as in the first to sixth embodiments.

First Modified Example

Although the calibration solution 63*a* and the calibration gel 63*b* have been described as examples of the calibration agent, the calibration agent is not limited to a liquid or a gel, and may be, for example, an absorber containing a liquid.

Second Modified Example

Although the configuration in which the electrochemical sensor 90 includes the power switch 13*c* has been described, the configuration is not limited thereto. For example, the calibration switch 13*a* may also serve as a power switch. That is, when the calibration switch 13*a* is pressed, the electrochemical sensor 90 may be powered on and start the calibration operation.

Modified Example 3

The control unit 11 may restrict the measurement operation when the calibration member and the electrochemical sensor 90 are coupled and the calibration operation when the calibration member and the electrochemical sensor 90 are not coupled by software processing. For example, the control unit 11 includes a detection unit that detects coupling between the calibration member and the electrochemical sensor 90, does not perform the measurement operation even when the measurement switch 13*b* is pressed when the calibration member and the electrochemical sensor 90 are coupled, and does not perform the calibration operation even when the calibration switch 13*a* is pressed when the calibration member and the electrochemical sensor 90 are not coupled.

In this case, a configuration in which the measurement switch 13*b* is set to be inoperable when the calibration member and the electrochemical sensor 90 are coupled (for example, the sidewall portion of the holding portion 61 of the calibration holder 60) or a configuration in which the calibration switch 13*a* is set to be inoperable when the calibration member and the electrochemical sensor 90 are not coupled (for example, a configuration in which the calibration switch 13*a* does not protrude from the case 10*a*) is unnecessary.

Modified Example 4

The arrangement, the shape, and the size of each of the switches can be changed as appropriate. For example, in the electrochemical sensor 90 illustrated in FIG. 2, the measurement switch 13*b* is not limited to be provided on the front surface of the case 10*a* but may be provided on a side surface or a back surface of the case 10*a*. In the electrochemical sensor 90 illustrated in FIG. 2, the calibration switch 13*a* is not limited to be provided on the side surface of the case 10*a* but may be provided on the front surface or the back surface of the case 10*a*. In addition, the shape and size of the case 10*a* and the sensor head 30 are not limited to the configurations and can be appropriately changed.

Modified Example 5

The calibration holder 60 may be configured to have a space in which a container containing the calibration solution 63*a* can be installed, similar to the container installation portion 83 of the measurement holder 80, instead of the housing portion 63.

While various embodiments have been described with reference to the drawings, needless to say, the present invention is not limited to such examples. It will be apparent to those skilled in the art that various changes and modifications can be made within the scope of the claims, and it is understood that these are naturally belong within the technical scope of the present invention. Further, components of the above-described embodiments may be combined as desired within a range that does not depart from the spirit of the present invention.

Note that the present application is based on Japanese Patent Application filed on Nov. 10, 2021 (JP 2021-183711), the content of which is incorporated herein by reference.

REFERENCE NUMERALS LIST

1*a*, 60*a*, 80*a*, 90*a* Front surface
1*b*, 60*b*, 80*b*, 90*b* Upper surface
10 Body
10*a* Case
11 Control unit
12 Data input unit
13 Operation unit
13*a* Calibration switch
13*b* Measurement switch
13*c* Power switch
13*d* Magnetic switch
13*e*, 13*f*, 67*a*, 67*b* Electrode
13*g* Measurement restriction release switch
13*h* Detection circuit
14 Sensor head connection detection unit
18 Memory
20 Display unit
21 Connector
22 Slot
23, 24 Contact member
30, 30A Sensor head
30*x* Electrode pad portion
31 Substrate
31*a* Mounting surface
31*c* Side
41 Sodium ion selective electrode
41*i* Sodium ion selective membrane
41*m* First internal electrode
41*m*' First core material lower layer
41*m*" First core material upper layer
42 Potassium ion selective electrode
42*i* Potassium ion selective membrane
42*m* Second internal electrode
42*m*' Second core material lower layer
42*m*" Second core material upper layer
43 First extraction electrode
44 Second extraction electrode
50 Insulating substrate
51, 52 Opening
60 Calibration holder
61, 81 Holding portion
62, 82 Sensor head insertion hole
63 Housing portion
63*a* Calibration solution
63*b* Calibration gel
64, 65, 84 Switch
66 Magnet
67*c* Short-circuit path
69, 89 Base
70 Container
70*a* Liquid to be measured
80 Measurement holder
83 Container installation portion
90 Electrochemical sensor
211, 212 Hole
220 Calibration agent case
221, 233, 243, 253 Opening portion
222, 232, 244, 254 Pin
230 Measurement spoon
231, 242 Dish portion
240 Calibration spoon
250 Calibration cap

The invention claimed is:

1. An electrochemical sensor for measuring a concentration ratio between sodium ions and potassium ions in a liquid to be measured, comprising:
- a sensor head;
- a calculation unit that allows performing a calibration operation and a measurement operation, the calibration operation calculating a characteristic parameter of the sensor head based on sensing data of the sensor head in a state where the sensor head is brought into contact with a calibration agent, the measurement operation calculating the concentration ratio based on the characteristic parameter of the sensor head and sensing data of the sensor head in a state where the sensor head is brought into contact with the liquid to be measured;
- a calibration switch that causes the calculation unit to perform the calibration operation; and
- a measurement switch that causes the calculation unit to perform the measurement operation, wherein
- the sensor head is brought into contact with the calibration agent by coupling the electrochemical sensor to a calibration member,
- the measurement switch is inoperable when the electrochemical sensor is coupled to the calibration member, and the calibration switch is inoperable when the electrochemical sensor is not coupled to the calibration member,
- the calibration member is a calibration holder that holds the electrochemical sensor in the state where the sensor head is brought into contact with the calibration agent, and
- the calibration holder includes a switch for operating the calibration switch of the held electrochemical sensor from an outside of the calibration holder.

2. The electrochemical sensor according to claim 1, wherein
- the calibration operation is allowed to be performed when the electrochemical sensor is coupled to the calibration member, and the measurement operation is allowed to be performed when the electrochemical sensor is not coupled to the calibration member.

3. The electrochemical sensor according to claim 1, wherein
- the calibration switch is operable when the electrochemical sensor is coupled to the calibration member, and the measurement switch is operable when the electrochemical sensor is not coupled to the calibration member.

4. The electrochemical sensor according to claim 1, wherein
- the calibration holder includes a housing portion that houses the calibration agent, and the electrochemical sensor is held in the state where the sensor head is brought into contact with the calibration agent housed in the housing portion.

5. The electrochemical sensor according to claim 1, wherein the calibration holder includes an operation unit that operates the calibration switch by holding the electrochemical sensor.

6. The electrochemical sensor according to claim 5, wherein the operation unit is a magnet, and the calibration switch is a magnetic switch.

7. The electrochemical sensor according to claim 1, wherein the sensor head is brought into contact with the liquid to be measured by coupling the electrochemical sensor to a measurement holder.

8. The electrochemical sensor according to claim 7, wherein the measurement holder includes a switch for operating the measurement switch of the held electrochemical sensor from an outside of the measurement holder.

9. The electrochemical sensor according to claim 7, wherein the measurement holder includes a shielding portion that shields the calibration switch of the held electrochemical sensor.

10. The electrochemical sensor according to claim 1, wherein the sensor head includes a sodium ion selective electrode that selectively reacts with the sodium ions and a potassium ion selective electrode that selectively reacts with the potassium ions, and the sensing data of the sensor head in the state where the sensor head is brought into contact with the liquid to be measured is a potential difference between the sodium ion selective electrode and the potassium ion selective electrode.

11. A measuring device, comprising:

the electrochemical sensor according to claim 1.

12. An electrochemical sensor for measuring a concentration ratio between sodium ions and potassium ions in a liquid to be measured, comprising:

a sensor head;

a calculation unit that allows performing a calibration operation and a measurement operation, the calibration operation calculating a characteristic parameter of the sensor head based on sensing data of the sensor head in a state where the sensor head is brought into contact with a calibration agent, the measurement operation calculating the concentration ratio based on the characteristic parameter of the sensor head and sensing data of the sensor head in a state where the sensor head is brought into contact with the liquid to be measured;

a calibration switch that causes the calculation unit to perform the calibration operation; and a measurement switch that causes the calculation unit to perform the measurement operation, wherein the sensor head is brought into contact with the calibration agent by coupling the electrochemical sensor to a calibration member, the measurement switch is inoperable when the electrochemical sensor is coupled to the calibration member, and the calibration switch is inoperable when the electrochemical sensor is not coupled to the calibration member, the calibration member is a calibration holder that holds the electrochemical sensor in the state where the sensor head is brought into contact with the calibration agent, and the calibration holder includes shielding portion that shields the measurement switch of the held electrochemical sensor.

* * * * *